US012646198B2

(12) United States Patent
Shinkawa

(10) Patent No.: US 12,646,198 B2
(45) Date of Patent: Jun. 2, 2026

(54) DETECTION DEVICE, CONTROL METHOD FOR DETECTION DEVICE, METHOD FOR GENERATING MODEL BY MODEL GENERATION DEVICE THAT GENERATES TRAINED MODEL, AND RECORDING MEDIUM

(71) Applicant: OMRON Corporation, Kyoto (JP)

(72) Inventor: Daiki Shinkawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 327 days.

(21) Appl. No.: 18/280,951

(22) PCT Filed: Mar. 16, 2022

(86) PCT No.: PCT/JP2022/011800
§ 371 (c)(1),
(2) Date: Sep. 8, 2023

(87) PCT Pub. No.: WO2022/230413
PCT Pub. Date: Nov. 3, 2022

(65) Prior Publication Data
US 2024/0169578 A1 May 23, 2024

(30) Foreign Application Priority Data

Apr. 26, 2021 (JP) ................................. 2021-074210

(51) Int. Cl.
*G06T 7/70* (2017.01)
*G06T 7/11* (2017.01)
*G06V 10/25* (2022.01)

(52) U.S. Cl.
CPC .................. *G06T 7/70* (2017.01); *G06T 7/11* (2017.01); *G06V 10/25* (2022.01); *G06T 2207/30196* (2013.01); *G06V 2201/07* (2022.01)

(58) Field of Classification Search
CPC ........... H04N 23/698; G06T 7/11; G06T 7/70; G06T 2207/30196; G06V 10/25;
(Continued)

(56) References Cited

U.S. PATENT DOCUMENTS 9,294,753 B2 * 3/2016 Lee ...................... H04N 13/189
2018/0253596 A1 * 9/2018 Barman ............... G06V 10/147
(Continued)

FOREIGN PATENT DOCUMENTS

CN 104067605 9/2014
CN 111461106 7/2020
(Continued)

OTHER PUBLICATIONS

Ahmed et al. "Top view multiple people tracking by detection using deep SORT and YOLOv3 with transfer learning: within 5G infrastructure." International Journal of Machine Learning and Cybernetics 12.11 (2020): 3053-3067. (Year: 2020).*
(Continued)

*Primary Examiner* — Katrina R Fujita
(74) *Attorney, Agent, or Firm* — JCIPRNET

(57) ABSTRACT

A detection device detects an imaged human from a captured image captured by a ceiling camera using a fish-eye lens, and includes a division part, an area estimation part, and a determination part. The division part divides the captured image into a plurality of areas. The area estimation part calculates a probability that each of the plurality of areas includes a position where a detection target estimated to be a human is present. The determination part determines whether the detection target is a human using the probability of each of the plurality of areas.

10 Claims, 18 Drawing Sheets

Learn as class "1"

Detection rectangle BB(1)

(58) Field of Classification Search
CPC ........ G06V 10/82; G06V 20/52; G06V 40/10;
G06V 40/103; G06V 2201/07
See application file for complete search history.

(56) References Cited

U.S. PATENT DOCUMENTS

| | | | | | |
|---|---|---|---|---|---|
| 2019/0171871 | A1* | 6/2019 | Zhang | ..................... | G06F 17/18 |
| 2021/0012106 | A1* | 1/2021 | Markhasin | ............. | G06V 20/52 |
| 2022/0004749 | A1* | 1/2022 | Tanaka | ................... | G06F 18/25 |
| 2022/0198803 | A1* | 6/2022 | Tanaka | ................ | G06V 40/103 |

FOREIGN PATENT DOCUMENTS

| | | |
|---|---|---|
| CN | 111507161 | 8/2020 |
| CN | 111868780 | 10/2020 |
| JP | 2016099668 | 5/2016 |
| JP | 2016171526 | 9/2016 |
| JP | 2020021111 | 2/2020 |
| JP | 2020107070 | 7/2020 |
| WO | 2020137160 | 7/2020 |

OTHER PUBLICATIONS

Li et al. "Supervised people counting using an overhead fisheye camera." 2019 16th IEEE international conference on advanced video and signal based surveillance (AVSS). IEEE, 2019. (Year: 2019).*
"Office Action of China Counterpart Application", issued on Jun. 25, 2025, with English translation thereof, p. 1-p. 19.
"International Search Report (Form PCT/ISA/210) of PCT/JP2022/011800", mailed on May 17, 2022, with English translation thereof, pp. 1-4.
"Written Opinion of the International Searching Authority (Form PCT/ISA/237) of PCT/JP2022/011800", mailed on May 17, 2022, with English translation thereof, pp. 1-8.

* cited by examiner

Detection rectangle BB(1)

Detection rectangle BB(2)

Start

| Generate training data classifying for each position | S110 |

| Acquire generated training data | S120 |

| Perform multi-class learning | S130 |

| Store trained model in storage part | S140 |

End

Learn as class "1"

Detection
rectangle
BB(1)

| Class | 0 | 1 | 2 | 3 | 4 | 5 | 6 |
|---|---|---|---|---|---|---|---|
| Probability | 0. 3 | 0. 7 | 0. 05 | 0. 05 | 0. 02 | 0. 075 | 0. 075 |

| Class | 0 | 1 | 2 | 3 | 4 | 5 | 6 |
|---|---|---|---|---|---|---|---|
| Probability | 0.1 | 0.2 | 0.3 | 0.1 | 0.05 | 0.05 | 0.2 |

Specific area
IA(3)

Detection
rectangle
BB(3)

Specific area
IA(3)

Detection
rectangle
BB(3)

| Class | 0 | 1 | 2 | 3 | 4 | 5 | 6 |
|---|---|---|---|---|---|---|---|
| Probability | 0.2 | 0.45 | 0.4 | 0.05 | 0.02 | 0.075 | 0.075 |

Object reliability:920

| Class | 0 | 1 | 2 | 3 | 4 | 5 | 6 |
|---|---|---|---|---|---|---|---|
| Probability | 0 | 0. 4 | 0. 005 | 0. 45 | 0. 005 | 0. 14 | 0 |

Class confidence value =920*0. 4=368  >  Threshold (350)

Detection rectangle BB(2)

Specific area IA(2)

Object reliability:625

| Class | 0 | 1 | 2 | 3 | 4 | 5 | 6 |
|---|---|---|---|---|---|---|---|
| Probability | 0. 1 | 0. 2 | 0. 3 | 0. 1 | 0. 05 | 0. 05 | 0. 2 |

Class confidence value =625*0. 2=125 ≦ Threshold (350)

Specific area
IA(3)

Detection
rectangle
BB(3)

Object reliability:800

| Class | 0 | 1 | 2 | 3 | 4 | 5 | 6 |
|---|---|---|---|---|---|---|---|
| Probability | 0. 3 | 0. 3 | 0. 45 | 0. 05 | 0. 02 | 0. 075 | 0. 075 |

Class confidence value =800∗ {(0. 3+0. 45)/2}=300 ＞ Threshold (250)

Buffer area BA(2-3)

Buffer area BA(1-2)

Buffer area BA(3-4)

Buffer area BA(6-1)

Buffer area BA(4-5)

Buffer area BA(5-6)

Classification result
0 : 0. 357
1 : 0. 569
2 : 0. 032
3 : 0. 004
4 : 0. 006
5 : 0. 002
6 : 0. 006

1

DETECTION DEVICE, CONTROL METHOD FOR DETECTION DEVICE, METHOD FOR GENERATING MODEL BY MODEL GENERATION DEVICE THAT GENERATES TRAINED MODEL, AND RECORDING MEDIUM

CROSS-REFERENCE TO RELATED APPLICATION

This application is a 371 application of the International PCT application serial no. PCT/JP2022/011800, filed on Mar. 16, 2022, which claims the priority benefits of Japan Patent Application No. 2021-074210, filed on Apr. 26, 2021. The entirety of each of the above-mentioned patent applications is hereby incorporated by reference herein and made a part of this specification.

TECHNICAL FIELD

The present invention relates to a detection device that detects an imaged human from a captured image captured by a ceiling camera using a fish-eye lens and the like.

BACKGROUND ART

In the related art, various studies of detecting a human by analyzing an image captured using a fish-eye lens are known. For example, Patent Literature 1 below discloses an image sensor that accurately detects a human from a wide range image using a plurality of dictionary information pieces.

RELATED ART LITERATURE

Patent Literature

Patent Literature 1: Japanese Patent Application Laid-Open No. 2016-171526

SUMMARY OF INVENTION

Problem to be Solved by Invention

However, the above conventional technologies have a problem that the time required to detect a human is lengthened because a human is detected from an image using a plurality of dictionaries indicating human characteristics compared to when there is one dictionary indicating human characteristics.

An objective of one aspect of the present invention is to detect a human from an image captured using a fish-eye lens at a high speed and with high accuracy.

Means for Solving Problem

In order to achieve the above objective, a detection device according to one aspect of the present invention is a detection device that detects an imaged human from a captured image captured by a ceiling camera using a fish-eye lens, and includes a division part that divides the captured image into a plurality of areas, an area estimation part that calculates a probability that each of the plurality of areas includes a position where a detection target estimated to be a human is present, and a determination part that determines whether the detection target is a human using the probability of each of the plurality of areas.

In order to achieve the above objective, a control method according to one aspect of the present invention is a control method for a detection device that detects an imaged human from a captured image captured by a ceiling camera using a fish-eye lens, including a division step in which the captured image is divided into a plurality of areas; an area estimation step in which a probability that each of the plurality of areas includes a position where a detection target estimated to be a human is present is calculated; and a determination step of determining whether the detection target is a human using the probability of each of the plurality of areas.

In order to achieve the above objective, a model generation method according to one aspect of the present invention is a model generation method performed by a model generation device that generates a trained model, including an acquisition step of acquiring training data in which (A) information indicating a position, shape, and size of a bounding box surrounding a human captured in a captured image and (B) information identifying an "area including 'a position where the human captured in the captured image is present'" are attached as labels to the captured image divided into a plurality of areas; and a learning step in which a trained model is constructed according to machine learning performed on the training data, where the trained model receives the captured image and outputs (C) information indicating the position, shape, and size of the bounding box and (D) "a probability that each of the plurality of areas includes 'the position where the human captured in the captured image is present'".

Effects of Invention

According to one aspect of the present invention, an effect of being able to detect a human from an image captured using a fish-eye lens at a high speed and with high accuracy is obtained.

DESCRIPTION OF EMBODIMENTS

Embodiment 1

Figure 1:
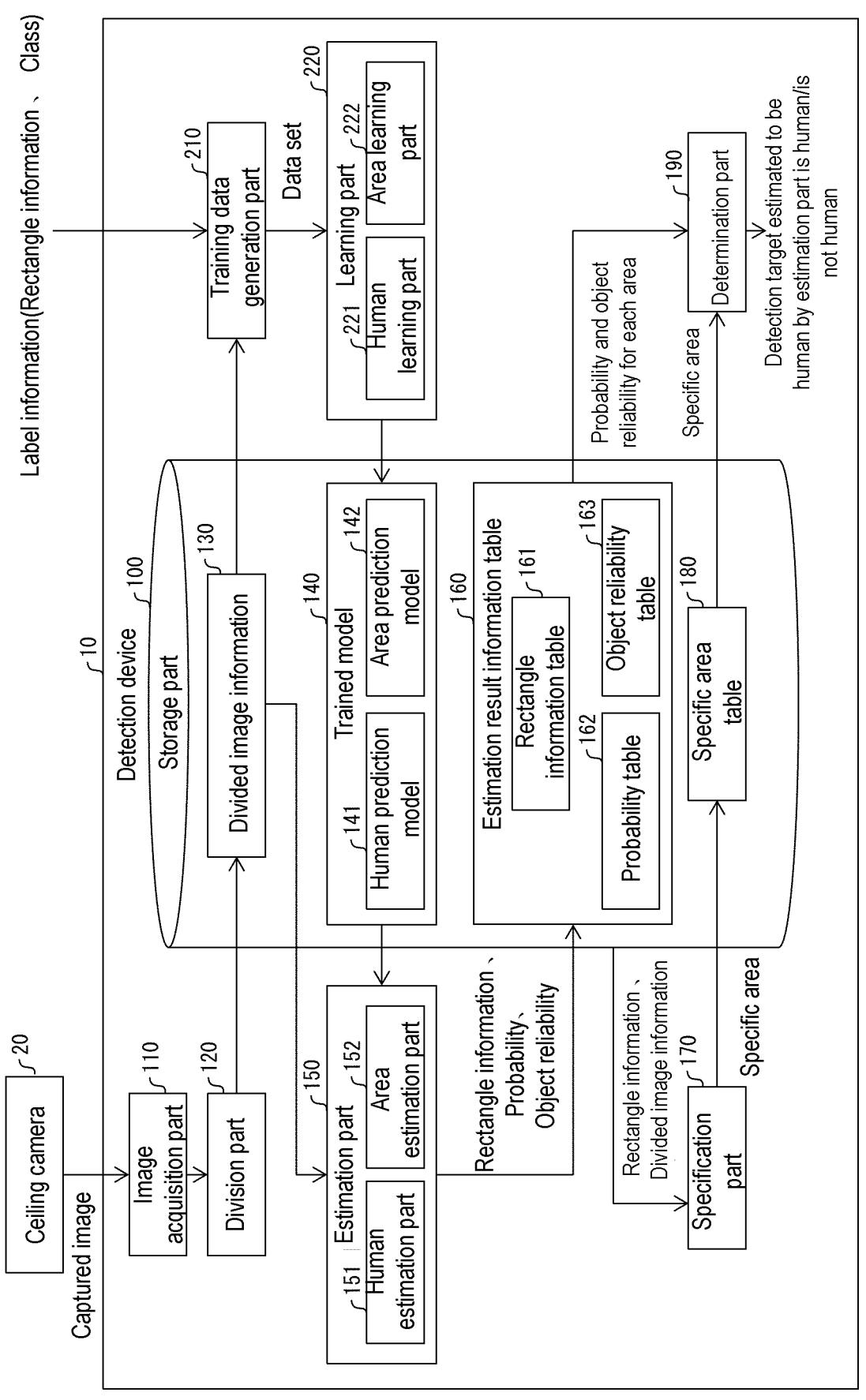
FIG. 1 is a block diagram showing a main part configuration of a detection device according to Embodiment 1 of the present invention.

Hereinafter, an embodiment according to one aspect of the present invention (hereinafter, referred to as "the present embodiment") will be described with reference to FIG. 1 to FIG. 19. Here, the same or corresponding parts in the drawings are denoted with the same reference numerals and descriptions thereof will not be repeated. In the present embodiment, for example, a detection device 10 will be described as a typical example of a detection device that detects an imaged human from a captured image PI captured by a ceiling camera 20 using a fish-eye lens.

In the following description, "m," "n," "p," "q," "x," and "y" each indicate an integer of "1" or more. In addition, "m" is an integer of "n" or less, "p" and "q" are different integers, and "x" and "y" are different integers.

In addition, when it is necessary to distinguish a plurality of areas AR from each other, subscripts such as "(1)," "(2)," "(3)," . . . , "(n)" are appended to signs for distinguishing. For example, "area AR(1)," "area AR(2)," "area AR(3)," . . . , "area AR(n)" are distinguished from each other. When it is not necessary to particularly distinguish the plurality of areas AR, they are simply referred to as the "area AR." The same applies to the detection rectangle BB, the detection target OB, the position PS and the like.

In order to facilitate understanding of the detection device 10 according to one aspect of the present invention, first, an overview of a human detection system 1 including the detection device 10 will be described with reference to FIG. 2.

§ 1. Application Example (General Overview of Human Detection System)

Figure 2:
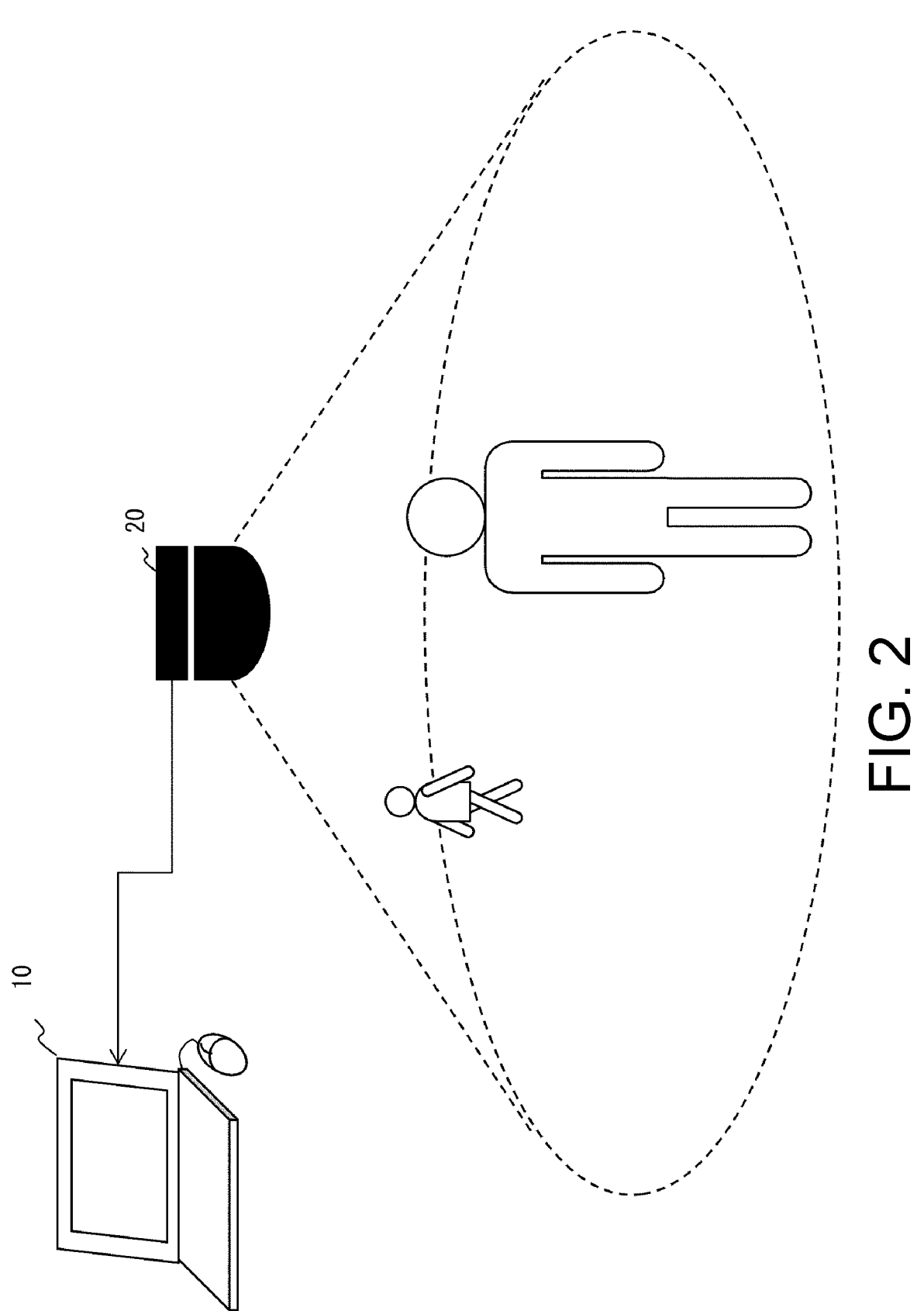
FIG. 2 is a diagram showing a general overview of a human detection system including a detection device in FIG. 1.

FIG. 2 is a diagram showing a general overview of the human detection system 1 including the detection device 10. As shown in FIG. 2, the human detection system 1 includes the ceiling camera 20 that generates a captured image PI and the detection device 10 that performs image analysis on the captured image PI generated by the ceiling camera 20 and detects a human captured in the captured image PI. The ceiling camera 20 and the detection device 10 are communicatively connected to each other, for example, via a communication cable which is a Universal Serial Bus (USB) cable.

The ceiling camera 20 is an imaging device that can image an imaging target space in a wide range using a fish-eye lens (ultra wide-angle lens). The ceiling camera 20 is installed, for example, on a ceiling of a factory Fa, and generates a captured image PI in which a plurality of workplaces Ar in the factory Fa are viewed from above (diagonally above). The ceiling camera outputs the generated captured image PI to the detection device 10.

The detection device 10 acquires the captured image PI generated by the ceiling camera from the ceiling camera 20. The detection device 10 performs image analysis on the acquired captured image PI, and detects a human captured in the captured image PI.

(Regarding Need to Detect Human with High Accuracy)

In order to improve the work process performed in the factory Fa, it is required to detect workers (humans) in the factory Fa with high accuracy from the captured image PI obtained by capturing the factory Fa. However, it is not easy to detect a human (human body) captured in the captured image PI with high accuracy by performing image analysis on the captured image PI captured by a fish-eye camera such as the ceiling camera 20.

(Occurrence of Incorrect Detection)

Figure 3:
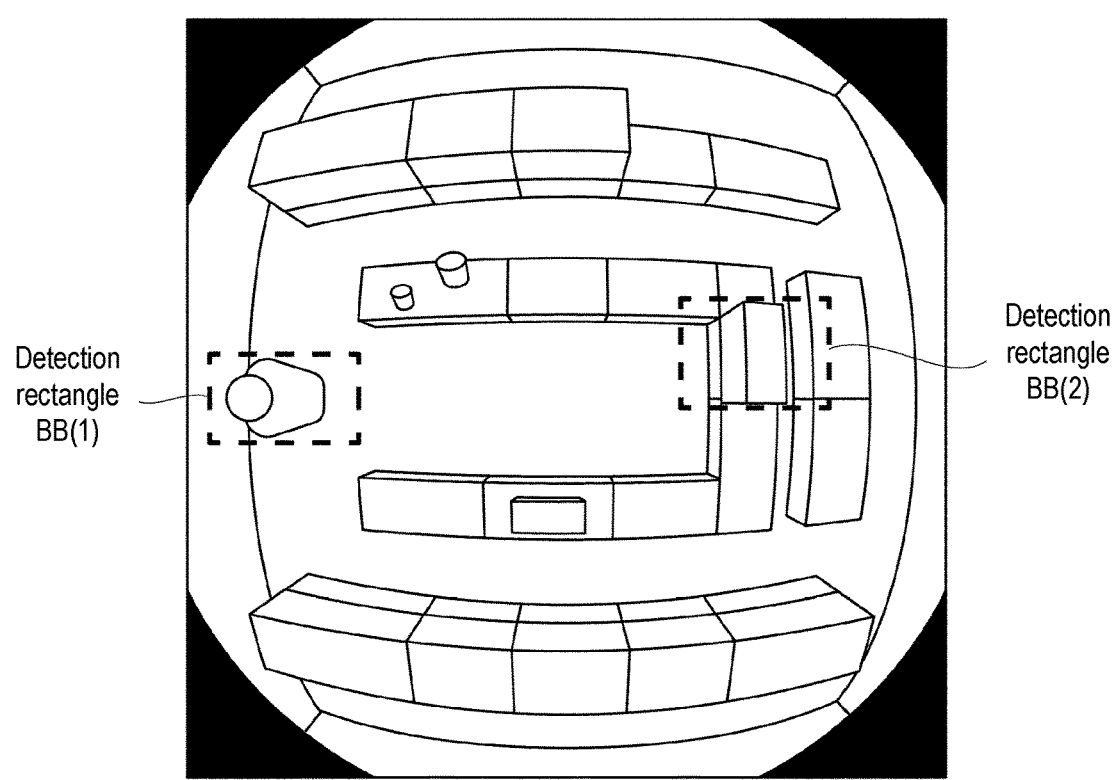
FIG. 3 is a diagram showing an example in which incorrect detection occurs in an attempt to detect a human from a captured image.

FIG. 3 is a diagram showing an example in which incorrect detection occurs in an attempt to detect a human from the captured image PI captured by the ceiling camera 20. In the image analysis performed on the captured image PI using the trained model, for example, a detection rectangle BB (referred to as a "bounding box") is set around a detection target OB estimated to be a "human (human body)" so that it surrounds the detection target OB.

In the captured image PI exemplified in FIG. 3, two detection rectangles BB surrounding the detection target OB estimated to be a human are set, specifically, a detection rectangle BB(1) and a detection rectangle BB(2) are set.

In the captured image PI exemplified in FIG. 3, among the detection rectangles BB surrounding the detection target OB estimated to be a human, the detection target OB surrounded by the detection rectangle BB(1) is actually a "human." However, the detection target OB surrounded by the detection rectangle BB(2) is actually not a "human."

As shown in FIG. 3, even if a trained model is used, it is not easy to detect (estimate) the "human captured in the captured image PI" from the captured image PI with high accuracy.

(Reduction of Incorrect Detection)

Here, the detection device 10 reduces incorrect detection of a human using a trained model 140 constructed by multi-class learning when a human (human body) is detected by performing image analysis on the captured image PI. That is, the detection device 10 divides the captured image PI into a plurality of areas AR, and estimates the "area AR including the position PS where the detection target OB estimated to be a human is present (for example, the position corresponding to the feet of a "human," the foot position)" as the class of the detection target OB. Then, the detection device 10 verifies the correctness of estimation that the "detection target OB is a human" using the estimated class of the detection target OB.

That is, the detection device 10 learns "the type (class) of a human captured in the captured image PI" attached as a label to the captured image PI in addition to rectangle information attached as a label to the captured image PI in training data DT, and constructs the trained model 140.

Specifically, in the training data DT learned by the detection device 10, in the captured image PI, rectangle information specifying the position, shape, and size of the detection rectangle BB surrounding a human captured in the captured image PI is attached as a label.

In addition, the detection device 10 divides the captured image PI into a plurality of areas AR. Then, in the training data DT learned by the detection device 10, in the captured image PI, information (class) specifying the area AR to which the "position PS of a human captured in the captured image PI (for example, the position corresponding to the feet of a human, the foot position)" belongs is attached as a label. The detection device 10 learns identification information of the area AR to which the "position PS where a human captured in the captured image PI is present" belongs, in other words, identification information of the area AR including the "position PS where a human captured in the captured image PI is present" as the human class.

The detection device 10 performs learning (machine learning) on a data set DS, which is a set of "training data DT in which rectangle information and a class are attached as labels to the captured image PI" and constructs the trained model 140.

Although details will be described below, for example, the captured image PI is divided into a plurality of areas AR according to at least one of a plurality of straight lines (some of a plurality of straight lines) that intersect each other at a predetermined angle substantially at the center of the captured image PI and the distance from the substantially the center.

The detection device 10 performs estimation using the trained model 140 constructed by learning detection information and the class of a human captured in the captured image PI and estimates the detection rectangle BB surrounding the human and the area AR (class) to which the position PS where the human is present belongs from the captured image PI.

The multi-class learning performed by the detection device 10 is machine learning in which, in addition to learning "where to set the detection rectangle BB" (rectangle information), the class of the detection target OB (object), that is, "the area AR including the 'position PS where the detection target OB is present'" is learned. The detection device 10 estimates the class of the detection target OB, that is, estimates "the area AR to which the 'position PS where the detection target OB is present' belongs" in addition to estimation of "where to set the detection rectangle BB" using the trained model 140 constructed by multi-class learning.

The detection device 10 verifies the correctness of estimation that the "detection target OB is a human" using the estimated class of the detection target OB, and thus detects (estimates) a human captured in the captured image PI from the captured image PI with high accuracy.

Particularly, the detection device 10 specifies the "area AR in which the 'detection rectangle BB set in the captured image PI using the trained model 140' is present" as a specific area IA. Then, the detection device 10 verifies the correctness of estimation that "the detection target OB surrounded by the detection rectangle BB is a human" using the estimated class of the detection target OB and the specified specific area IA.

For example, the detection device 10 compares consistency between the class output from the trained model 140 and the position of the detection rectangle BB (more accurately, the area AR in which the detection rectangle BB is present), and if they are different, removes the detection rectangle BB as an incorrect detection.

In addition, for example, the detection device 10 determines the correctness of the detection rectangle BB using the class output from the trained model 140, the area AR in which the detection rectangle BB is present, and the object reliability OR of the detection rectangle BB.

The overview of the detection device 10 that has been described so far with reference to FIG. 2 and FIG. 3 is summarized as follows. That is, the detection device 10 is a detection device that detects a human captured in the captured image PI from the captured image PI captured by the ceiling camera 20 using a fish-eye lens. The detection device 10 includes a division part 120, an area estimation part 152 (an estimation part 150), and a determination part 190.

The division part 120 divides the captured image PI into a plurality of areas AR. The estimation part 150 (for example, the area estimation part 152) calculates the "probability PR of including the position PS where the detection target OB estimated to be a 'human' is present" for each of the plurality of areas AR. The determination part 190 determines whether "the detection target OB is a human" using the probability PR of each of the plurality of areas AR.

According to the above configuration, the detection device 10 divides the captured image PI into a plurality of areas AR, and calculates the "probability PR of including the position PS where the detection target OB estimated to be a 'human' is present" for each of the plurality of areas AR. Then, the detection device 10 verifies the estimation result that the "detection target OB is a human" using the probability PR of each of the plurality of areas AR. The probability PR is the probability that the area AR includes the "position PS where the detection target OB estimated to be a "human" is present."

Here, generally, when it is attempted to detect a human from an image using a dictionary indicating human characteristics, analysis of the image is required for each dictionary. Therefore, when it is tried to improve human detection accuracy using a plurality of dictionaries indicating human characteristics, it is necessary to analyze the image a plurality of times and a time required to detect a human increases.

On the other hand, the detection device 10 determines whether the detection target OB is a human using "the probability PR of including the position PS where the detection target OB estimated to be a human is present" calculated for each of the plurality of areas AR obtained by dividing the captured image PI, and thus improve human detection accuracy. That is, the detection device 10 does not detect a human from the captured image PI using a plurality of dictionaries indicating human characteristics, but determines whether the detection target OB estimated to be a human is actually a human using the probability PR of each of the plurality of areas AR, and thus improves human detection accuracy.

In the method using a plurality of dictionaries indicating human characteristics, the accuracy of the estimation itself is improved, but the detection device 10 verifies (that is, removes incorrect estimation results from) the estimated result (estimation that the detection target OB is a human), and thus improves detection accuracy.

Therefore, the detection device 10 does not need to use a plurality of dictionaries indicating human characteristics in order to detect a human from the captured image PI and can shorten the time required to detect a human from the captured image PI compared to when a human is detected from the captured image PI using a plurality of dictionaries.

In addition, the detection device 10 determines (verifies) whether the detection target OB estimated to be a human is actually a human using the probability PR of each of the plurality of areas AR, and thus can detect a human from the captured image PI with high accuracy.

Therefore, the detection device 10 has an effect of being able to detect a human from the image captured using a fish-eye lens (captured image PI) at a high speed and with high accuracy.

In addition, as described above, the detection device 10 does not need to use a plurality of dictionaries indicating human characteristics in order to detect a human from the captured image PI.

Therefore, the detection device 10 has an effect of reducing the time and effort required to prepare a dictionary (for example, a trained model) required for detecting a human from an image captured using a fish-eye lens and reducing the memory capacity required to store the dictionary.

The detection device 10 further includes a specification part 170 that specifies, as a specific area IA, the area AR in which the detection rectangle BB surrounding the detection target OB is present among the plurality of areas AR. Then, the determination part 190 determines whether "the detection target OB is a human" using the probability PR of each of the plurality of areas AR and the specific area IA.

According to the above configuration, the detection device 10 specifies a specific area IA, which is the area AR in which the detection rectangle BB is present, among the plurality of areas AR, and determines "whether the detection target OB is a human" using the probability PR of each of the plurality of areas AR and the specific area IA.

For example, when the detection target OB estimated to be a human is actually a human, consistency between the probability PR of each of the plurality of areas AR and the area AR (that is, the specific area IA) in which the detection rectangle BB surrounding the detection target OB is present is also considered to be high.

Here, the detection device 10 determines "whether the detection target OB is a human" using the probability PR of each of the plurality of areas AR and the specific area IA, that is, verifies estimation that the "detection target OB is a human."

Therefore, the detection device 10 has an effect of being able to detect a human from an image captured using a fish-eye lens (captured image PI) with high accuracy.

The specification part 170 may specify the position PS of the detection target OB, which is surrounded by the detection rectangle BB and estimated to be a "human" (for example, the position corresponding to the feet in the detection target OB estimated to be a "human") or the area AR including the position PS of the detection target OB as a specific area IA. The specification part 170 may calculate the position PS (foot position) of the detection target OB from the detection rectangle BB, for example, calculate the position from the position, shape, and size of the detection rectangle BB. In addition, the specification part 170 may specify the center position (or the position of the center of gravity) of the detection rectangle BB as the position PS (foot position) of the detection target OB, which is surrounded by the detection rectangle BB and estimated to be a "human."

In the detection device 10, the area estimation part 152 (the estimation part 150) calculates the probability PR of each of the plurality of areas AR from the captured image PI using an area prediction model 142 (the trained model 140). The area prediction model 142 (the trained model 140) is a trained model that receives a captured image PI and outputs the probability PR of including the "position PS where the detection target OB surrounded by the detection rectangle BB is present" for each of the plurality of areas AR.

According to the above configuration, the detection device 10 calculates the probability PR of each of the plurality of areas AR from the captured image PI using the area prediction model 142 (the trained model 140). Therefore, the detection device 10 has an effect of being able to calculate the probability PR of each of the plurality of areas AR with high accuracy from the captured image PI using the area prediction model 142 (the trained model 140).

The detection device 10 may include a learning part 220 that constructs the area prediction model 142 (the trained model 140) by performing machine learning on the following training data DT. That is, the learning part 220 performs machine learning on the training data DT in which "information (that is, the class) indicating 'the area AR including the position PS where a human captured in the captured image PI is present'" is attached as a label to the captured image PI.

According to the above configuration, the detection device 10 performs machine learning on the training data DT in which "information indicating the area AR including the position PS where a human is present" is attached as a label to the captured image PI and thus constructs the area prediction model 142 (the trained model 140).

Therefore, the detection device 10 has an effect of being able to construct the area prediction model 142 (the trained model 140) which enables the probability PR of each of the plurality of areas AR to be calculated from the captured image PI with high accuracy by performing machine learning on the training data DT.

§ 2. Configuration Example

The overview of the human detection system 1 has been described so far with reference to FIG. 2 and FIG. 3. Next, details of the configuration of the detection device 10 will be described with reference to FIG. 1.

(Detailed Configuration of Detection Device)

FIG. 1 is a block diagram showing a main part configuration of the detection device 10. As shown in FIG. 1, the detection device 10 includes, as functional blocks, a storage part 100, an image acquisition part 110, the division part 120, the estimation part 150, the specification part 170, the determination part 190, a training data generation part 210, and the learning part 220.

The detection device 10 may include, in addition to the above functional blocks, a display part that displays the results of the human detection process, the captured image PI and the like, and a communication part that outputs these as data to an external device. However, in order to secure simplicity of description, configurations that are not directly related to the present embodiment are omitted from the description and block diagrams. However, depending on actual circumstances, the detection device 10 may include the omitted configuration.

The above functional blocks of the detection device 10 can be implemented when, for example, a calculation device reads and executes a program stored in a storage device (the storage part 100) implemented by a read only memory (ROM), a non-volatile random access memory (NVRAM) or the like in a random access memory (RAM) (not shown) or the like.

Examples of devices that can be used as a calculation device include a central processing unit (CPU), a graphic processing unit (GPU), a digital signal processor (DSP), a micro processing unit (MPU), a floating point number processing unit (FPU), a physics processing unit (PPU), a microcontroller, and combinations thereof.

Hereinafter, first, details of the image acquisition part 110, the division part 120, the estimation part 150, the specification part 170, the determination part 190, the training data generation part 210, and the learning part 220 will be described.

(Details of Functional Blocks Other than Storage Part)

The image acquisition part 110 acquires the captured image PI captured by the ceiling camera 20 from the ceiling camera 20. The image acquisition part 110 outputs the captured image PI acquired from the ceiling camera 20 to the division part 120.

The division part 120 acquires the captured image PI from the image acquisition part 110 and divides the acquired captured image PI into a plurality of areas AR by a predetermined division method. The "predetermined division method" may be set in advance by a user, or a user can update (change) the preset "predetermined division method." For example, the "predetermined division method" set in advance by the user is stored in the storage part 100. The division part 120 stores the captured image PI divided into a plurality of areas AR in the storage part 100 as divided image information 130.

The estimation part 150 performs image analysis on the captured image PI divided into a plurality of areas AR by the division part 120 (that is, the captured image PI stored in the divided image information 130) using the trained model 140 and generates (outputs) rectangle information and a class. The estimation part 150 may output the rectangle information and the class from the captured image PI that is not divided into a plurality of areas AR by the division part 120 by using the trained model 140. That is, the captured image PI that is input by the estimation part 150 to the trained model 140 may or may not be divided into a plurality of areas AR by the division part 120.

In the example shown in FIG. 1, the estimation part 150 includes a human estimation part 151 and the area estimation part 152. The human estimation part 151 outputs the rectangle information from the captured image PI using the trained model 140 (particularly, a human prediction model 141). The area estimation part 152 outputs the class of the detection target OB surrounded by the detection rectangle BB (specifically, the probability PR of each of the plurality of areas AR calculated for each detection rectangle BB) from the captured image PI using the trained model 140 (particularly, the area prediction model 142).

In FIG. 1, in order to facilitate understanding of the detection device 10, the human estimation part 151 and the area estimation part 152 are separately described, but the estimation part 150 including the human estimation part 151 and the area estimation part 152 may be implemented via one neural network. In other words, functions of the human estimation part 151 and the area estimation part 152 may be implemented via one neural network. In addition, a neural network that implements functions of the human estimation part 151 and a neural network that implements functions of the area estimation part 152 may be separated.

In the following description, an example in which the estimation part 150 is implemented as one neural network will be described. The estimation part 150 may be implemented as, for example, a convolutional neural network (CNN), a regional convolutional neural network (Faster R-CNN), or a deep neural network (DNN).

The estimation part 150 implemented as a neural network outputs rectangle information and a class from the captured image PI using the trained model 140. In addition, the estimation part 150 outputs an object reliability OR, which is information indicating the degree of possibility that a certain object is surrounded by the detection rectangle BB, for each detection rectangle BB.

The object reliability OR is information indicating the possibility that the detection rectangle BB includes a certain object (detection target OB) or that the detection rectangle BB includes only the background, and is information indicating the degree of possibility that the detection rectangle BB includes a certain object according to the value. That is, the object reliability OR is information indicating the degree of possibility that the detection rectangle BB surrounds a certain detection target OB (possibility that a certain object is surrounded by the detection rectangle BB).

First, the estimation part 150 refers to the storage part 100 and acquires the trained model 140. Next, the estimation part 150 refers to the divided image information 130 of the storage part 100 and acquires the captured image PI divided into a plurality of areas AR. Then, the estimation part 150 outputs the rectangle information, the class, and the object reliability OR from the captured image PI using the trained model 140. That is, the estimation part 150 sets one or more detection rectangles BB in the captured image PI and calculates the "probability PR of including the "position PS of the detection target OB surrounded by the detection rectangle BB" of each of the plurality of areas AR" for each set detection rectangle BB. In addition, the estimation part 150 calculates the object reliability OR for each detection rectangle BB.

The estimation part 150 stores the estimation result estimated from the captured image PI using the trained model 140 in an estimation result information table 160. Specifically, the estimation part 150 stores the rectangle information, the class, and the object reliability OR in a rectangle information table 161, a probability table 162, and an object reliability table 163 of the storage part 100, respectively.

The specification part 170 specifies the area AR in which the detection rectangle BB is present, that is, the area AR including the detection rectangle BB, as a specific area IA for each of one or more detection rectangles BB set in the captured image PI by the estimation part 150.

Specifically, the specification part 170 refers to the rectangle information table 161 of the storage part 100 and acquires the position, shape and size of each of one or more detection rectangles BB set in the captured image PI. In addition, the specification part 170 refers to the divided image information 130 of the storage part 100 and acquires the position, shape and size of each of the plurality of areas AR obtained by dividing the captured image PI. The specification part 170 specifies which area AR includes for each of one or more detection rectangles BB set in the captured image PI from the "position, shape and size of the detection rectangle BB" and the "position, shape and size of each of the plurality of areas AR."

The specification part 170 may specify "the position PS of the detection target OB, which is surrounded by the detection rectangle BB and estimated to be a 'human'" and for example, specify the "position (foot position) corresponding to the feet of a "human" in the detection target OB estimated to be a 'human'." The specification part 170 may calculate the position PS (foot position) of the detection target OB from the detection rectangle BB, for example, calculate the position from the position, shape, and size of the detection rectangle BB. In addition, the specification part 170 may specify the center position (or the position of the center of gravity) of the detection rectangle BB as "the position PS of the detection target OB, which is surrounded by the detection rectangle BB and estimated to be a "human" (foot position)." The specification part 170 may specify the area AR in which the position PS (foot position) of the detection target OB is present, that is, the area AR including the position PS, as a specific area IA.

The specification part 170 stores the specific area IA specified for each detection rectangle BB in a specific area table 180 of the storage part 100. The specification part 170 may specify, as a specific area IA for each detection rectangle BB, the "position PS of the detection target OB, which is surrounded by the detection rectangle BB and estimated to be a "human" (foot position)," and store the specified position PS for each detection rectangle BB in the specific area table 180.

The determination part 190 determines whether "the detection target OB estimated to be a human by the estimation part 150 is actually a human" using the class of the detection target OB. That is, the determination part 190 determines the correctness of rectangle information output from the captured image PI by the estimation part 150 using the trained model 140 using the class output from the captured image PI by the estimation part 150 using the trained model 140. In other words, the determination part 190 determines "whether the detection target OB surrounded by the detection rectangle BB is actually a human" using the class of the detection target OB.

If it is determined that the "detection target OB surrounded by the detection rectangle BB is actually a human," the determination part 190 adopts the detection rectangle BB (that is, the detection target OB) as a correct estimation. If it is determined that the "detection target OB surrounded by the detection rectangle BB is not actually a human," the determination part 190 removes the detection rectangle BB (that is, the detection target OB) as an incorrect detection (incorrect estimation).

Particularly, the determination part 190 determines "whether the detection target OB surrounded by the detection rectangle BB is actually a human" based on the class of the detection target OB surrounded by the detection rectangle BB and the specific area IA which is the area AR in which the detection rectangle BB is present.

Specifically, the determination part 190 refers to the estimation result information table 160, particularly, refers to the probability table 162, and acquires "PR of each of the plurality of areas AR" for each detection rectangle BB. In addition, the determination part 190 refers to the estimation result information table 160, particularly, refers to the object reliability table 163 and acquires the object reliability OR for each detection rectangle BB. In addition, the determination part 190 refers to the specific area table 180 and acquires a specific area IA for each detection rectangle BB.

The determination part 190 determines "whether the detection target OB surrounded by the detection rectangle BB is a human" using "at least one of "PR of each of the plurality of areas AR" for each detection rectangle BB, and the object reliability OR for each detection rectangle BB" and a specific area IA for each detection rectangle BB.

For example, in a first verification method, for each detection rectangle BB, the determination part 190 determines whether "the area AR with the highest probability PR of including 'the position PS of the detection target OB surrounded by the detection rectangle BB' matches the specific area IA." When the determination part 190 confirms that the area AR with the highest probability PR matches the specific area IA of the detection rectangle BB, it is determined that "the detection target OB surrounded by the detection rectangle BB is a human." When the determination part 190 confirms that the area AR with the highest probability PR does not match the specific area IA of the detection rectangle BB, it is determined that "the detection target OB surrounded by the detection rectangle BB is not a human (that is, the detection rectangle BB is incorrect detection)."

For example, in a second verification method, for each detection rectangle BB, the determination part 190 determines "whether "the class confidence value CR of the detection rectangle BB" calculated by multiplying the probability PR of the area AR corresponding to the specific area IA by the object reliability OR of the detection rectangle BB is larger than a predetermined value TH." When the determination part 190 confirms that "the class confidence value CR of the detection rectangle BB is larger than a predetermined value TH," it is determined that "the detection target OB surrounded by the detection rectangle BB is a human." When the determination part 190 confirms that the "class confidence value CR of the detection rectangle BB is equal to or smaller than a predetermined value TH," it is determined that "the detection target OB surrounded by the detection rectangle BB is not a human (that is, the detection rectangle BB is incorrect detection)."

The training data generation part 210 attaches "rectangle information and a class" received from the user as labels to the captured image PI divided into a plurality of areas AR by the division part 120 (that is, the divided image information 130) and generates training data DT.

The learning part 220 performs supervised learning on the data set DS, which is a set of training data DT generated by the training data generation part 210, and constructs the trained model 140. The learning part 220 stores the constructed trained model 140 in the storage part 100.

In the example shown in FIG. 1, the learning part 220 includes a human learning part 221 that learns rectangle information and an area learning part 222 that learns the class for each detection target OB surrounded by the detection rectangle BB. In FIG. 1, in order to facilitate understanding of the detection device 10, the human learning part 221 and the area learning part 222 are separately described, but the learning part 220 including the human learning part 221 and the area learning part 222 may be implemented via one neural network. In other words, functions of the human learning part 221 and the area learning part 222 may be implemented via one neural network. In addition, a neural network that implements functions of the human learning part 221 and a neural network that implements functions of the area learning part 222 may be separated.

In the following description, an example in which the learning part 220 is implemented as one neural network will be described. The learning part 220 may be implemented as, for example, a convolutional neural network (CNN), a regional convolutional neural network (Faster R-CNN), or a deep neural network (DNN).

(Details of Storage Part)

The storage part 100 is a storage device that stores various types of data used by the detection device 10. Here, the storage part 100 may non-temporarily store (1) a control program executed by the detection device 10, (2) an OS program, (3) an application program for executing various functions of the detection device 10, and (4) various types of data read when the application program is executed. The above data types (1) to (4) are stored in a non-volatile storage device, for example, a read only memory (ROM), a flash memory, an erasable programmable ROM (EPROM), an electrically EPROM (EEPROM, registered trademark), and a hard disc drive (HDD). The detection device 10 may include a temporary storage part (not shown). The temporary storage part is a so-called working memory that temporarily stores data used for calculation, calculation results and the like in the procedure of various processes executed by the detection device 10 and is configured as a volatile storage device such as a random access memory (RAM). Which data is stored in which storage device is appropriately determined based on the purpose of use, convenience, cost, and physical constraints of the detection device 10. The storage part 100 additionally stores the divided image information 130, the trained model 140, the estimation result information table 160, and the specific area table 180.

The divided image information 130 is information indicating the captured image PI divided into a plurality of areas AR by the division part 120, and is information stored by the division part 120.

The trained model 140 is a trained model that receives a captured image PI and outputs rectangle information and the "probability PR (that is, the class) of including "the position PS where the detection target OB surrounded by the detection rectangle BB is present" of each of the plurality of areas AR" for each detection rectangle BB. The trained model 140 is constructed by the learning part 220 and is stored in the storage part 100 by the learning part 220.

In the example shown in FIG. 1, the trained model 140 includes the human prediction model 141 and the area prediction model 142. The human prediction model 141 is a trained model that receives a captured image PI and outputs rectangle information (information indicating the position, shape and size of the detection rectangle BB surrounding the detection target OB estimated to be a "human"). The area prediction model 142 is a trained model that receives a captured image PI and outputs the class (that is, the probability PR of each of the plurality of areas AR) for each detection target OB surrounded by the detection rectangle BB.

In FIG. 1, in order to facilitate understanding of the detection device 10, the human prediction model 141 and the area prediction model 142 are separately described, but the trained model 140 including the human prediction model 141 and the area prediction model 142 in an integral manner may be stored in the storage part 100.

In the estimation result information table 160, the estimation result estimated (output) from the captured image PI by the estimation part 150 using the trained model 140 is stored. The estimation result information table 160 includes the rectangle information table 161, the probability table 162, and the object reliability table 163.

In the rectangle information table 161, rectangle information output from the captured image PI by the estimation part 150 using the trained model 140 is stored. In other words, in the rectangle information table 161, information indicating the position, shape and size of each of one or more detection rectangles BB set in the captured image PI by the estimation part 150 using the trained model 140 is stored.

In the probability table 162, the class output from the captured image PI by the estimation part 150 using the trained model 140 (more accurately, the class for each detection target OB surrounded by the detection rectangle BB) is stored. In other words, in the probability table 162, for each detection rectangle BB, "the "probability PR of including the "position PS of the detection target OB surrounded by the detection rectangle BB" of each of the plurality of areas AR," is stored.

For example, regarding the detection rectangle BB(x), a probability PR(x–0), a probability PR(x–1), a probability PR(x–2), —, and a probability PR(x–n), which are respective probabilities PR of the area AR(0) to the area AR(n), are stored in the probability table 162. Similarly, for example, regarding the detection rectangle BB(y), a probability PR(y–0), a probability PR(y–1), a probability PR(y–2), —, a probability PR(y–n), which are respective probabilities PR of the area AR(0) to the area AR(n), are stored in the probability table 162.

In the object reliability table 163, for each of one or more detection rectangles BB set in the captured image PI by the estimation part 150 using the trained model 140, an object reliability OR which is information indicating the degree of possibility that a certain object is surrounded by the detection rectangle BB is stored. In other words, in the object reliability table 163, the object reliability OR for each detection rectangle BB is stored.

In the specific area table 180, information identifying the specific area IA for each detection rectangle BB is stored. In other words, in the specific area table 180, for each detection rectangle BB, information identifying the specific area IA which is the area AR including the detection rectangle BB is stored.

In the specific area table 180, as the specific area IA for each detection rectangle BB, "the position PS of the detection target OB, which is surrounded by the detection rectangle BB and estimated to be a "human" (for example, foot position)" may be stored. The position PS (foot position) of the detection target OB is calculated from the detection rectangle BB, and is calculated from, for example, the position, shape, and size of the detection rectangle BB. In addition, the specific area IA for each detection rectangle BB may be the area AR including "the position PS of the detection target OB, which is surrounded by the detection rectangle BB and estimated to be a 'human'." As described above, "the position PS of the detection target OB, which is surrounded by the detection rectangle BB and estimated to be a "human" (foot position)" may be the center position of the detection rectangle BB or the position of the center of gravity.

§ 3. Operation Example

Hereinafter, various processes performed by the detection device 10 will be described with reference to FIG. 4 to FIG. 19. Specifically, the learning process performed by the detection device 10 will be described with reference to FIG. 4 to FIG. 6, and the human detection process performed by the detection device 10 will be described with reference to FIG. 7 to FIG. 19.

(Overview of Learning Process)

The detection device 10 performs, for example, a learning process (that is, a generation process of the trained model 140). In the learning process, the detection device 10 (particularly, the training data generation part 210) first attaches rectangle information and a class as labels to the captured image PI divided into a plurality of areas AR and generates training data DT.

The rectangle information is information indicating the "position, shape and size of the detection rectangle BB surrounding a human captured in the captured image PI." For example, the rectangle information includes "X-axis coordinates and Y-axis coordinates of the upper right point of the detection rectangle BB" and "X-axis coordinates and Y-axis coordinates of the lower left point of the detection rectangle BB."

The class is identification information of the "area AR including 'the position PS where a human captured in the captured image PI is present (for example, the position corresponding to the feet of a human, foot position)'." The class can also be rephrased as information specifying the area AR including the "detection rectangle BB surrounding a human captured in the captured image PI."

Then, the detection device 10 (particularly, the learning part 220) performs learning (supervised learning) on the data set DS, which is a set of training data DT, and constructs the trained model 140. The learning part 220 stores the constructed trained model 140 in the storage part 100.

As described above, in the detection device 10, the learning part 220 performs learning (for example, deep learning) on the data set DS, which is a set of training data generated by the training data generation part 210, and constructs the trained model 140. In this manner, the detection device 10 also functions as a model generation device that constructs the trained model 140.

(Example of Learning Process)

Figure 4:
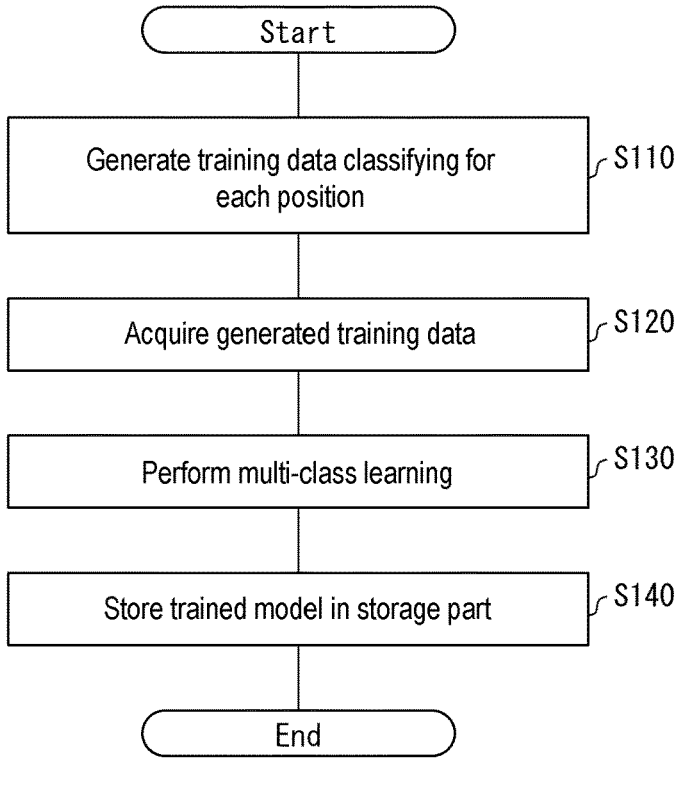
FIG. 4 is a flowchart illustrating an example of a generation process in which a trained model used by the detection device in FIG. 1 is generated.

FIG. 4 is a flowchart illustrating an example of a generation process (learning process) in which the trained model 140 used by the detection device 10 is generated. The trained model 140 is generated by the detection device 10 performing learning (machine learning) on, for example, the data set DS, which is a set of training data DT. However, an object that performs learning on the data set DS to generate the trained model 140 is not essentially the detection device 10. A device different from the detection device 10 may include the training data generation part 210 and the learning part 220, and perform learning on the data set DS to generate the trained model 140.

Hereinafter, an example in which the detection device 10 performs learning (for example, supervised learning) on a data set DS to generate (construct) the trained model 140 will be described.

As exemplified in FIG. 4, first, the training data generation part 210 generates training data DT that classifies an imaged human for each position PS of the imaged human (more accurately, the area AR including the position PS) (S110). That is, in the training data DT generated by the training data generation part 210, the class (identification information of the area AR including the human's position PS (foot position)) of a human captured in the captured image PI is attached to the captured image PI.

Specifically, first, the training data generation part 210 refers to the divided image information 130 of the storage part 100 and acquires the "captured image PI divided into a plurality of areas AR." The training data generation part 210 presents the acquired "captured image PI divided into a plurality of areas AR" to a user, and encourages the user to add an annotation to the "captured image PI divided into a plurality of areas AR." Then, the training data generation part 210 acquires rectangle information and a class as labels (label information) attached to the "captured image PI divided into a plurality of areas AR" from the annotation by the user.

The learning part 220 acquires the training data DT generated by the training data generation part 210 from the training data generation part 210 (S120). The learning part 220 performs multi-class learning (machine learning) on the data set DS acquired from the training data generation part 210, which is a set of training data DT (S130), and generates (constructs) the trained model 140. For example, the learning part 220 performs supervised learning on the data set DS to generate the trained model 140.

The learning part 220 stores the generated trained model 140 in the storage part 100 (S140).

As described so far with reference to FIG. 4, a model generation method performed by the detection device 10 is a "model generation method performed by a model generation device that generates a trained model," and includes the following two processes. That is, the model generation method includes an acquisition step (S120) in which training data DT is acquired and a learning step (S130) in which learning is performed on a data set DS, which is a set of training data DT, to construct the trained model 140.

In the training data DT acquired in the acquisition step, the following information is attached as a label to the captured image PI divided into a plurality of areas AR. That is, (A) information indicating the position, shape and size of the detection rectangle BB surrounding a human captured in the captured image PI (rectangle information), and (B) information identifying the area AR including the position PS where a human captured in the captured image PI is present (class) are attached as labels.

The trained model 140 constructed in the learning step is a trained model that receives a captured image PI and outputs (C) rectangle information, and (D) the "probability PR of including the 'position PS where a human captured in the captured image PI is present'" of each of the plurality of areas AR.

According to the above configuration, in the model generation method, machine learning is performed on the training data DT (more accurately, the data set DS, which is a set of training data DT) to construct the trained model 140. When the captured image PI is input, the trained model 140 outputs the following two pieces of information. That is, (C) information indicating the position, shape and size of the detection rectangle BB (rectangle information), and (D) the "probability PR of including the 'position PS where a human captured in the captured image PI is present'" of each of the plurality of areas AR are output.

The rectangle information is information indicating the position, shape and size of the detection rectangle BB surrounding the detection target OB estimated to be a "human" and is information including estimation that "the detection target OB surrounded by the detection rectangle BB is a 'human'."

Therefore, the model generation method has an effect of being able to construct the trained model 140 in which, when the captured image PI is input, the "rectangle information including estimation that the detection target OB is a 'human'" and the probability PR (that is, the class) of each of the plurality of areas AR are output.

(Example of Dividing Captured Image)

Figure 5:
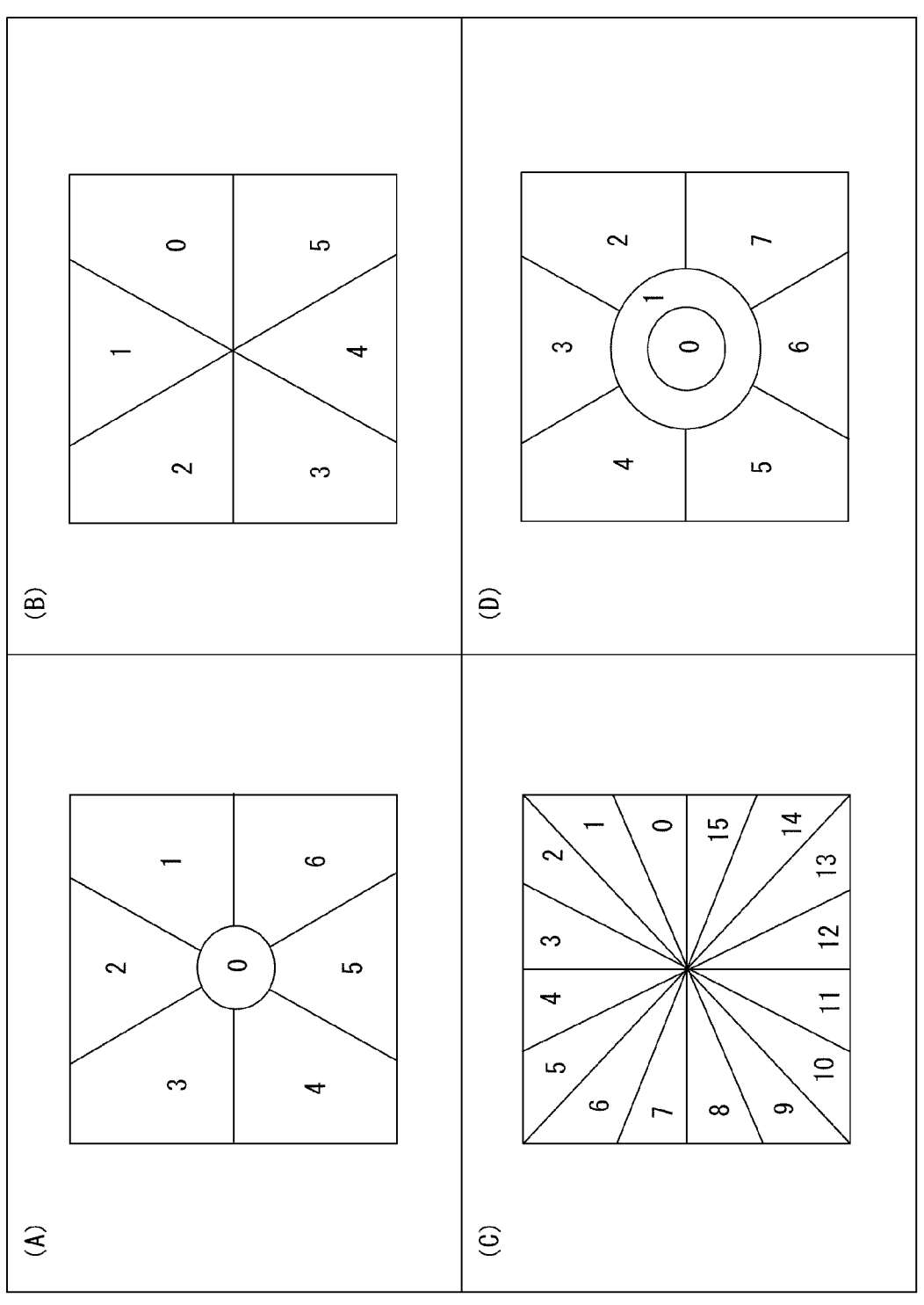
FIG. 5 is a diagram showing examples of a captured image divided into a plurality of areas.

FIG. 5 is a diagram showing examples of the captured image PI divided into a plurality of areas AR by the detection device 10. For example, the detection device 10 (particularly, the division part 120) may divide the captured image PI into a plurality of areas AR according to the distance from the center of the captured image PI. In other words, the division part 120 may divide the captured image PI into a plurality of areas AR whose boundary lines are the circumferences of one or more concentric circles (or ellipses) with "the center of the captured image PI" as a center.

In addition, for example, the division part 120 may divide the captured image PI into a plurality of fan-shaped areas AR having a predetermined central angle. In other words, the division part 120 may divide the captured image PI into a plurality of areas AR whose boundary lines are some of a plurality of straight lines that intersect each other at a predetermined angle substantially at the center of the captured image PI (a plurality of straight lines that extend radially from substantially the center of the captured image PI and intersect each other at a predetermined angle).

In addition, for example, the division part 120 may perform division into a plurality of areas AR whose boundary lines are at least one of circumferences of one or more concentric circles (ellipses) with "substantially the center of the captured image PI" as a center, and some of a plurality of straight lines that intersect each other at a predetermined angle substantially at the center of the captured image PI.

In the example shown in (A) of FIG. 5, the division part 120 defines the inner side of one circle (ellipse) with "the center of the captured image PI" as a center within the captured image PI as the area AR(0). In addition, the division part 120 divides the area outside the above circle (ellipse) with "the center of the captured image PI" as a center within the captured image PI into six areas AR including the area AR(1) to the area AR(6) according to some of a plurality of straight lines that intersect each other at 60 degrees at the center of the captured image PI. Therefore, the captured image PI exemplified in (A) of FIG. 5 is divided into seven areas AR including the area AR(0), area AR(1), area AR(2), . . . , area AR(6) by the division part 120.

In (A) of FIG. 5, the area AR(0) may be additionally divided by the division part 120 according to some of a plurality of straight lines that intersect each other at a predetermined angle at the center of the captured image PI. For example, the division part 120 may additionally divide the area AR(0) in (A) of FIG. 5 into the area AR(0–0), area AR(0–1), area AR(0–2), . . . , area AR(0–n).

In the example shown in (B) of FIG. 5, the division part 120 divides the captured image PI into six areas AR including the area AR(0) to the area AR(5) according to a plurality of straight lines (some of straight lines) that intersect each other at 60 degrees at the center of the captured image PI. Therefore, the captured image PI exemplified in (B) of FIG. 5 is divided into six areas AR including the area AR(0), area AR(1), area AR(2), . . . , area AR(5) by the division part 120.

In the example shown in (C) of FIG. 5, the division part 120 divides the captured image PI into 16 areas AR including the area AR(0) to the area AR(15) according to some of a plurality of straight lines that intersect each other at 22.5 degrees at the center of the captured image PI. Therefore, the captured image PI exemplified in (C) of FIG. 5 is divided into 16 areas AR including the area AR(0), area AR(1), area AR(2), . . . , area AR(15) by the division part 120.

It is not essential for the division part 120 to divide the captured image PI according to some of a plurality of straight lines that intersect each other at 22.5 degrees or 60 degrees at the center of the captured image PI. The division part 120 may divide the captured image PI according to a plurality of straight lines (some of straight lines) that intersect each other at 1 degree substantially at the center of the captured image PI, and divide the captured image PI according to a plurality of straight lines (some of straight lines) that intersect each other at 45 degrees substantially at the center of the captured image PI.

In the example shown in (D) of FIG. 5, the division part 120 defines the inner side of a smaller concentric circle between two concentric circles (ellipses) with "the center of the captured image PI" as a center within the captured image PI as the area AR(0). In addition, the detection device 10 defines the area inside a larger concentric circle (ellipse) between two concentric circles with "the center of the captured image PI" as a center within the captured image PI, that is, the area outside a smaller concentric circle (ellipse), as the area AR(1). In addition, the detection device 10 divides the area outside the above larger concentric circle (ellipse) within the captured image PI into six areas AR including the area AR(2) to the area AR(7) according to some of a plurality of straight lines that intersect each other at 60 degrees at the center of the captured image PI. Therefore, the captured image PI exemplified in (D) of FIG. 5 is divided into eight areas AR including the area AR(0), area AR(1), area AR(2), . . . , area AR(7) by the division part 120.

As described with reference to FIG. 5, the captured image PI is divided into a plurality of areas AR by the division part 120 according to a predetermined division method. The "predetermined division method" is set or changed by, for example, a user.

(Example of Learning Process)

Figure 6:
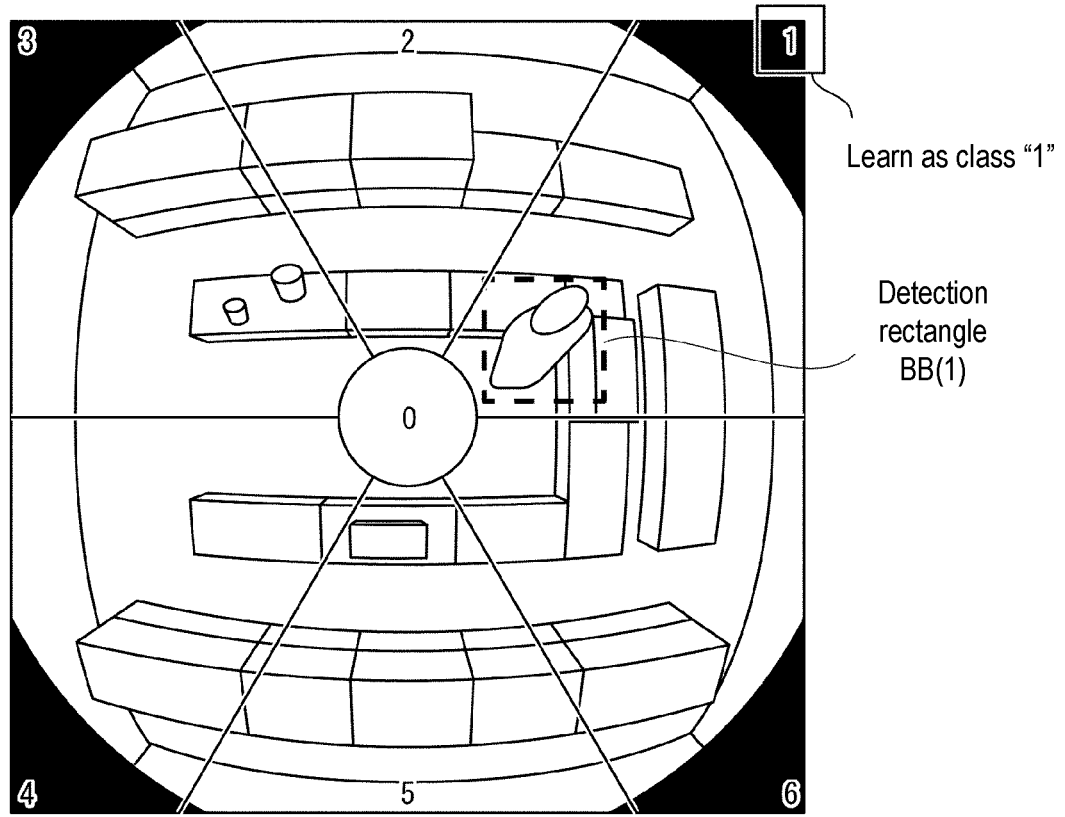
FIG. 6 is a diagram showing an example of training data learned in the generation process in FIG. 4.

FIG. 6 is a diagram showing an example of training data DT learned in the generation process (learning process) in FIG. 4, and the training data DT is generated by the training data generation part 210 and learned by the learning part 220. In the training data DT exemplified in FIG. 6, the captured image PI is divided into seven areas AR including the area AR(0) to the area AR(6) by the division part 120. The area AR(0) is an area inside one concentric circle (ellipse) with "'the center of the captured image PI' that substantially corresponds to the optical axis of the fish-eye lens of the ceiling camera 20'" as a center. In addition, the area outside the concentric circle (ellipse) is divided into six areas AR including the area AR(1) to the area AR(6) according to a plurality of straight lines that intersect each other at a predetermined angle (60 degrees in the example in FIG. 6) at the center of the captured image PI.

In the training data DT exemplified in FIG. 6, the detection rectangle BB(1) surrounding a human captured in the captured image PI (that is, rectangle information indicating the position, shape and size of the detection rectangle BB(1)) is attached as a label to the captured image PI.

In addition, in the training data DT exemplified in FIG. 6, "1" as the class of a human captured in the captured image PI is attached as a label to the captured image PI. The class of a human captured in the captured image PI is information identifying the area AR including the position PS where a human captured in the captured image PI is present from other areas AR.

In the training data DT exemplified in FIG. 6, the position PS where a human captured in the captured image PI is present is included in the area AR(1) among the area AR(0) to the area AR(6) obtained by dividing the captured image PI. As described above, the "position PS where a human captured in the captured image PI is present" is, for example, the "position corresponding to the feet of a human captured in the captured image PI (foot position)." In the example shown in FIG. 6, the position corresponding to the feet of a human captured in the captured image PI (human surrounded by the detection rectangle BB(1)) (foot position) is included in the area AR(1). Here, in the training data DT exemplified in FIG. 6, the class of a human captured in the captured image PI is "1."

The detection device 10 (particularly, the learning part 220) performs learning on the data set DS, which is a set of training data DT, exemplified in FIG. 6, and constructs the trained model 140. That is, the learning part 220 learns the training data DT in which rectangle information and a class are attached as labels to the captured image PI. Specifically, the learning part 220 learns the training data DT in which the "detection rectangle BB surrounding a human captured in the captured image PI" and "identification information of the area AR including the position PS where a human captured in the captured image PI is present" are attached as labels to the captured image PI.

(Overview of Human Detection Process)

The detection device 10 performs a human detection process in which "a human captured in the captured image PI" is detected from the captured image PI. The human detection process includes an estimation process in which estimation is performed using the trained model 140 constructed according to the learning process and a determination process in which the correctness of the result of the estimation process (estimation result) is determined.

In the estimation process, the detection device 10 (particularly, the estimation part 150 (the trained model 140)) inputs the captured image PI to the trained model 140 and thus outputs the rectangle information and the class. Specifically, the trained model 140 outputs, as the rectangle information, information indicating the position, shape and size of the detection rectangle BB surrounding the detection target OB estimated to be a "human." In addition, the trained model 140 outputs, as the class, identification information of the area AR including the position PS where the "detection target OB, which is surrounded by the detection rectangle BB and estimated to be a 'human'" is present, that is, the "probability PR of including the position PS" for each of the plurality of areas AR. The detection device 10 performs, for example, the estimation process using the trained model 140 constructed by deep learning and thus can improve a detection speed (estimation speed) and detection accuracy (estimation accuracy).

In the determination process, the detection device 10 (particularly, the determination part 190) determines the correctness of the estimation result, specifically, determines the correctness of "rectangle information output from the trained model 140" using the "class output from the trained model 140." Specifically, the determination part 190 performs a first determination process or a second determination process in the determination process.

In the first determination process, the determination part 190 determines the correctness of the class output from the trained model 140, and if it is determined that the class is correct, determines that the detection information output from the trained model 140 is correct. That is, if it is determined that the class is correct, the determination part 190 determines that estimation that "the detection target OB surrounded by the detection rectangle BB is a human" is also correct. In addition, if it is determined that the class output from the trained model 140 is incorrect, the determination part 190 determines that the detection information output from the trained model 140 is also incorrect. That is, if it is determined that the class is incorrect, the determination part 190 determines that estimation that "the detection target OB surrounded by the detection rectangle BB is a human" is also incorrect.

In the second determination process, for example, the determination part 190 determines whether the class confidence value CR calculated by multiplying the probability PR of the area AR (that is, the area AR corresponding to the specific area IA) in which the detection rectangle BB is present by the object reliability OR of the detection rectangle BB is larger than a predetermined value TH. If it is determined that the class confidence value CR is larger than a predetermined value TH, the determination part 190 determines that the detection information output from the trained model 140 is correct, that is, determines that estimation that "the detection target OB surrounded by the detection rectangle BB is a human" is correct. If it is determined that the class confidence value CR is equal to or less than a predetermined value TH, the determination part 190 determines that the detection information output from the trained model 140 is incorrect, that is, determines that estimation that "the detection target OB surrounded by the detection rectangle BB is a human" is incorrect.

Hereinafter, the first determination process will be described with reference to FIG. 7 to FIG. 13, and the second determination process will be described with reference to FIG. 14 to FIG. 19.

(Example of Human Detection Process Including First Determination Process)

Figure 7:
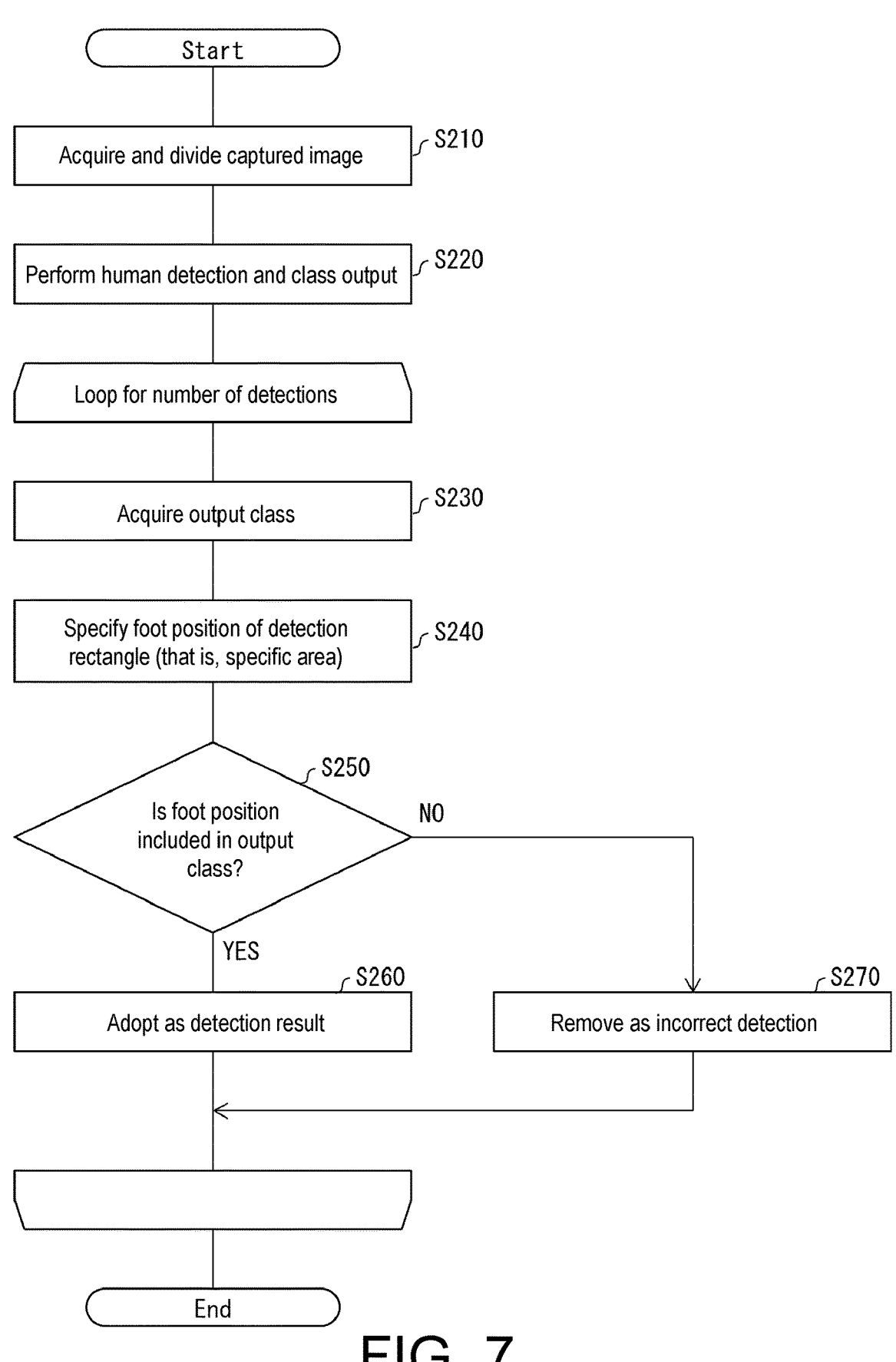
FIG. 7 is a flowchart illustrating an example of a human detection process in which a first determination process is performed on an output of the trained model generated in FIG. 4 to detect a human.

FIG. 7 is a flowchart illustrating an example of a human detection process in which a first determination process is performed on an output of the trained model 140 to detect a human. As shown in FIG. 7, first, the image acquisition part 110 acquires a captured image PI, and the division part 120 divides the captured image PI acquired by the image acquisition part 110 into a plurality of areas AR (S210). That is, first, the image acquisition part 110 acquires the captured image PI captured by the ceiling camera 20 from the ceiling camera 20. The image acquisition part 110 outputs the captured image PI that is acquired and captured to the division part 120. When the captured image PI is received from the image acquisition part 110, the division part 120 divides the received captured image PI into a plurality of areas AR by a predetermined division method. The division part 120 stores the captured image PI divided into a plurality of areas AR as the divided image information 130 in the storage part 100.

The estimation part 150 refers to the storage part 100 and acquires the trained model 140. In addition, the estimation part 150 refers to the divided image information 130 of the storage part 100 and acquires the captured image PI (the captured image PI divided into a plurality of areas AR) on which the estimation process should be performed. The estimation part 150 refers to the divided image information 130 and performs human detection and class output on the acquired captured image PI (the captured image PI divided into a plurality of areas AR) using the trained model 140 (S220). The estimation part 150 may perform human detection and class output on the captured image PI that has not been divided into a plurality of areas AR by the division part 120 using the trained model 140.

The estimation part 150 stores the result of the estimation process performed on the captured image PI using the trained model 140 in the estimation result information table 160 of the storage part 100. Specifically, the estimation part 150 stores the rectangle information, class, and, object reliability OR output from the trained model 140 to which the captured image PI is input in the storage part 100.

The rectangle information is information indicating the position, shape and size of each of one or more detection rectangles BB set in the captured image PI by the estimation part 150 (the trained model 140), that is, information indicating the position, shape and size for each detection rectangle BB. The rectangle information is stored in the rectangle information table 161 of the storage part 100.

The class is the "probability PR of including the "position PS of the detection target OB surrounded by the detection rectangle BB" of each of the plurality of areas AR" calculated for each detection target OB surrounded by the detection rectangle BB (that is, for each detection rectangle BB). The class is stored in the probability table 162 of the storage part 100.

The object reliability OR is information indicating the degree of "possibility that a certain object is surrounded by the detection rectangle BB" for each detection rectangle BB. The object reliability OR is stored in the object reliability table 163 of the storage part 100.

The detection device 10 performs processes S230 to S270 corresponding to the number of humans detected from the captured image PI by the estimation part 150, in other words, the number of detection rectangles BB set by the estimation part 150 for each detection rectangle BB (that is, for each detection target OB).

The determination part 190 refers to the probability table 162 of the storage part 100 and acquires the class (output class) for each detection target OB surrounded by the detection rectangle BB (that is, for each detection rectangle BB) (S230), that is, acquires the probability PR of each of the plurality of areas AR. Specifically, for each detection rectangle BB, the determination part 190 acquires the probability PR of including "the position PS where the detection target OB, which is surrounded by the detection rectangle BB and estimated to be a "human," is present" of each of the plurality of areas AR.

For example, the determination part 190 acquires the probability PR of each of the plurality of areas AR(0–1), PR(1–1), PR(2–1), . . . , PR(n–1) for the detection rectangle BB(1). Similarly, the determination part 190 acquires the probability PR of each of the plurality of areas AR(0–2), PR(1–2), PR(2–2), . . . , PR(n–2) for the detection rectangle BB(2).

For each detection rectangle BB, the specification part 170 acquires the "position PS of the detection target OB, which is surrounded by the detection rectangle BB and estimated to be a "human" (for example, the position corresponding to the position of feet of a "human," foot position)" (S240). For example, the specification part 170 refers to the storage part 100, acquires the rectangle information table 161, and calculates the "position PS (foot position) of the detection target OB" from the detection rectangle BB (the position, shape, and size of the detection rectangle BB) for each detection rectangle BB. The specification part 170 may specify the center position (or the position of the center of gravity) of the detection rectangle BB as the position PS (foot position) of the detection target OB. The specification part 170 sets "the position PS (foot position) of the detection target OB for each detection rectangle BB" calculated from the detection rectangle BB as the "position PS of the detection target OB, which is surrounded by the detection rectangle BB and estimated to be a 'human'" for each detection rectangle BB.

The determination part 190 determines whether the "foot position (position PS) of the detection target OB is included in the output class (that is, the area AR with the highest probability PR)" for each detection target OB (that is, for each detection rectangle BB surrounding the detection target OB) (S250).

Specifically, the determination part 190 first refers to the probability table 162 of the storage part 100 and acquires "the probability PR of each of the plurality of areas AR" for each detection target OB (that is, the detection rectangle BB). Next, the determination part 190 selects the area AR with the highest probability PR for each detection target OB (that is, the detection rectangle BB). Then, the determination part 190 determines whether the position PS (foot position) for each detection target OB is included in "the area AR with the highest probability PR" (that is, the output class) selected for each detection target OB (that is, the detection rectangle BB).

If the "position PS (foot position) of the detection target OB is included in the output class" (YES in S250), the determination part 190 adopts the detection rectangle BB as the correct detection result (S260). That is, if the "position PS (foot position) of the detection target OB is included in the output class," the determination part 190 determines that "estimation that 'the detection target OB surrounded by the detection rectangle BB is a human' is correct."

If the "position PS (foot position) of the detection target OB is not included in the output class" (NO in S250), the determination part 190 removes the detection rectangle BB as an incorrect detection (S270). That is, if the "position PS (foot position) of the detection target OB is not included in the output class," the determination part 190 determines that "estimation that 'the detection target OB surrounded by the detection rectangle BB is a human' is incorrect."

In the first determination process exemplified in FIG. 7, the detection device 10 (particularly, the determination part 190) determines whether "the position PS of the detection target OB is included in the 'area AR with the highest probability PR'" for each detection target OB (that is, the detection rectangle BB). However, in the first determination process, it is not essential for the determination part 190 to determine whether "the position PS of the detection target OB is included in the 'area AR with the highest probability PR'."

In the first determination process, it is sufficient for the determination part 190 to determine the correctness of "the class of the detection target OB" output from the captured image PI by the estimation part 150 (the trained model 140) for each detection target OB (that is, the detection rectangle BB). In the first determination process, it is sufficient for the determination part 190 to determine whether the position PS of the detection target OB estimated by the trained model 140 and the (actual) position PS of "the detection target OB, which is surrounded by the detection rectangle BB and estimated to be a 'human'" match at the level of the area AR. The (actual) position PS of "the detection target OB, which is surrounded by the detection rectangle BB and estimated to be a 'human'" is calculated from the detection rectangle BB (the position, shape, and size of the detection rectangle BB). In addition, the position PS may be, for example, the center position (or the position of the center of gravity) of the detection rectangle BB.

That is, in the first determination process, it is sufficient for the determination part 190 to determine whether the class (that is, the area AR with the highest probability PR) output from the trained model 140 matches the area AR (that is, the specific area IA) in which the detection rectangle BB is actually present. Although details will be described below, in the first determination process, the determination part 190 may determine whether "'the area AR with the highest probability PR' or 'the area AR adjacent to the area AR with the highest probability PR'" matches the area AR (that is, the specific area IA) in which the detection rectangle BB is actually present.

For example, in S240, for each detection rectangle BB, the specification part 170 specifies the area AR in which the detection rectangle BB is present as the specific area IA. The specification part 170 may specify, as the specific area IA, "the area AR including the "position PS (foot position) of the detection target OB" calculated from the detection rectangle BB (the position, shape, and size of the detection rectangle BB)." In addition, the specification part 170 may specify the area AR including the center position (or the position of the center of gravity) of the detection rectangle BB as the specific area IA.

Specifically, the specification part 170 refers to the storage part 100 and acquires the rectangle information table 161 and the divided image information 130. The specification part 170 specifies the specific area IA, which is the "area AR in which the detection rectangle BB is present" for each detection rectangle BB, from the acquired rectangle information table 161 and the divided image information 130. The specification part 170 stores information identifying the specific area IA specified for each detection rectangle BB in the specific area table 180 of the storage part 100.

For example, in S250, the determination part 190 may determine whether the specific area IA of the detection rectangle BB matches the "area AR with the highest probability PR" for each detection rectangle BB (that is, for each detection target OB).

Specifically, the determination part 190 refers to the specific area table 180 of the storage part 100 and acquires a specific area IA for each detection rectangle BB. In addition, the determination part 190 refers to the probability table 162 of the storage part 100, acquires the "probability PR of each of the plurality of areas AR" for each detection rectangle BB (that is, for each detection target OB), and selects the area AR with the highest probability PR for each detection rectangle BB. Then, the determination part 190 determines whether the specific area IA of the detection rectangle BB matches the "area AR with the highest probability PR" for each detection rectangle BB (that is, for each detection target OB).

The determination part 190 adopts the detection rectangle BB as a correct detection result if "the specific area IA of the detection rectangle BB matches the 'area AR with the highest probability PR'," that is, determines that "estimation that 'the detection target OB surrounded by the detection rectangle BB is a human' is correct."

The determination part 190 removes the detection rectangle BB as an incorrect detection if the "specific area IA of the detection rectangle BB does not match the 'area AR with the highest probability PR'," that is, determines that "estimation that 'the detection target OB surrounded by the detection rectangle BB is a human' is incorrect."

Although details will be described below, the determination part 190 may determine whether the specific area IA matches the "area AR with the highest probability PR" or the "area AR adjacent to the area AR with the highest probability PR."

Specifically, the determination part 190 may select the area AR with the highest probability PR and the area AR adjacent to the area AR with the highest probability PR for each detection rectangle BB from the "probability PR of each of the plurality of areas AR" for each detection rectangle BB (that is, for each detection target OB). Then, the determination part 190 may determine whether the specific area IA of the detection rectangle BB matches the "area AR with the highest probability PR" or the "area AR adjacent to the area AR with the highest probability PR" for each detection rectangle BB (that is, for each detection target OB).

In the first determination process, the determination part 190 determines the correctness of the "class of the detection target OB" output from the captured image PI by the estimation part 150 (the trained model 140) for each detection target OB (that is, the detection rectangle BB) using the specific area IA of the detection rectangle BB.

(Example of Output of Trained Model)

Figure 8:
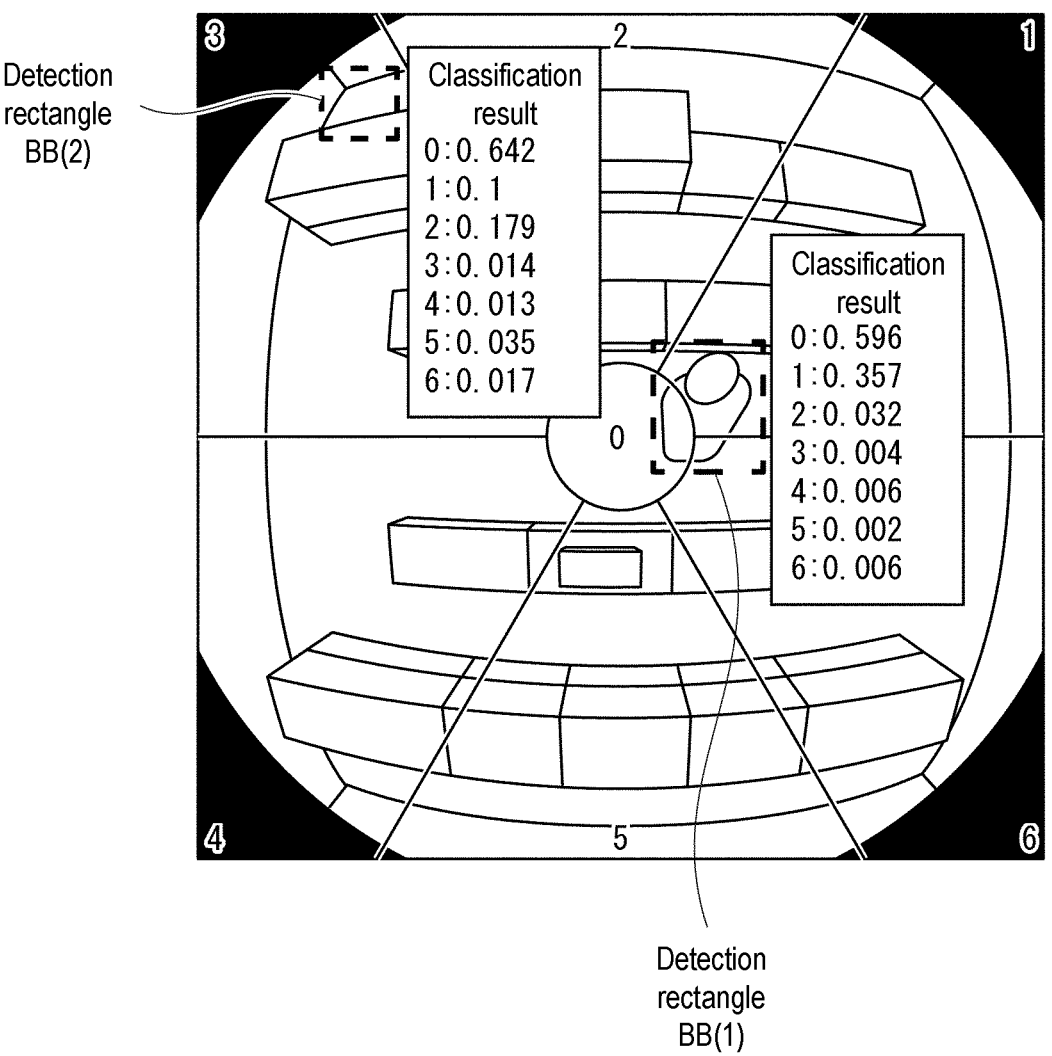
FIG. 8 is a diagram showing an example of classes in the output of the trained model generated in FIG. 4.

FIG. 8 is a diagram showing an example of classes in the output of the trained model 140. Specifically, FIG. 8 is a diagram showing an example of the class (that is, the probability PR of including the "position PS where the detection target OB is present" for each of the plurality of areas AR) output by the detection device 10 using the trained model 140 from the captured image PI. In the example shown in FIG. 8, the detection device 10 (particularly, the division part 120) divides the captured image PI into seven areas AR including the area AR(0), area AR(1), area AR(2), . . . , area AR(6).

In the example shown in FIG. 8, in the captured image PI, two detection rectangles BB are set, specifically, the detection rectangle BB(1) and the detection rectangle BB(2) are set. The detection rectangle BB(1) and the detection rectangle BB(2) are set so that they surround the detection target OB estimated to be a "human (human body)."

In addition, in the example shown in FIG. 8, the class of each of two detection targets OB estimated to be a "human" is output (calculated) by the trained model 140. Specifically, according to the trained model 140, the probability PR of including "the position PS(1) where the detection target OB(1) surrounded by the detection rectangle BB(1) is present" is calculated for each of seven areas AR including the area AR(0) to the area AR(6). Similarly, according to the trained model 140, the probability PR of including "the position PS(2) where the detection target OB(2) surrounded by the detection rectangle BB(2) is present" is calculated for each of seven areas AR including the area AR(0) to the area AR(6).

In the example shown in FIG. 8, "0.596" is calculated as the probability PR(0–1), which is the probability PR that the "area AR(0) includes the position PS(1)." "0.357" is calculated as the probability PR(1–1), which is the probability PR that the "area AR(1) includes the position PS(1)." "0.032" is calculated as the probability PR(2–1), which is the probability PR that the "area AR(2) includes the position PS(1)." "0.004" is calculated as the probability PR(3–1), which is the probability PR that the "area AR(3) includes the position PS(1)." "0.006" is calculated as the probability PR(4–1), which is the probability PR that the "area AR(4) includes the position PS(1)." "0.002" is calculated as the probability PR(5–1), which is the probability PR that the "area AR(5) includes the position PS(1)." "0.006" is calculated as the probability PR(6–1), which is the probability PR that the "area AR(6) includes the position PS(1)."

In the example shown in FIG. 8, "0.642" is calculated as the probability PR(0–2), which is the probability PR that the "area AR(0) includes the position PS(2)." "0.1" is calculated as the probability PR(1–2), which is the probability PR that the "area AR(1) includes the position PS(2)." "0.179" is calculated as the probability PR(2–2), which is the probability PR that the "area AR(2) includes the position PS(2)." "0.014" is calculated as the probability PR(3–2), which is the probability PR that the "area AR(3) includes the position PS(2)." "0.013" is calculated as the probability PR(4–2), which is the probability PR that the "area AR(4) includes the position PS(2)." "0.035" is calculated as the probability PR(5–2), which is the probability PR that the "area AR(5) includes the position PS(2)." "0.017" is calculated as the probability PR(6–2), which is the probability PR that the "area AR(6) includes the position PS(2)."

(Regarding Specification of Specific Area)

Figure 9:
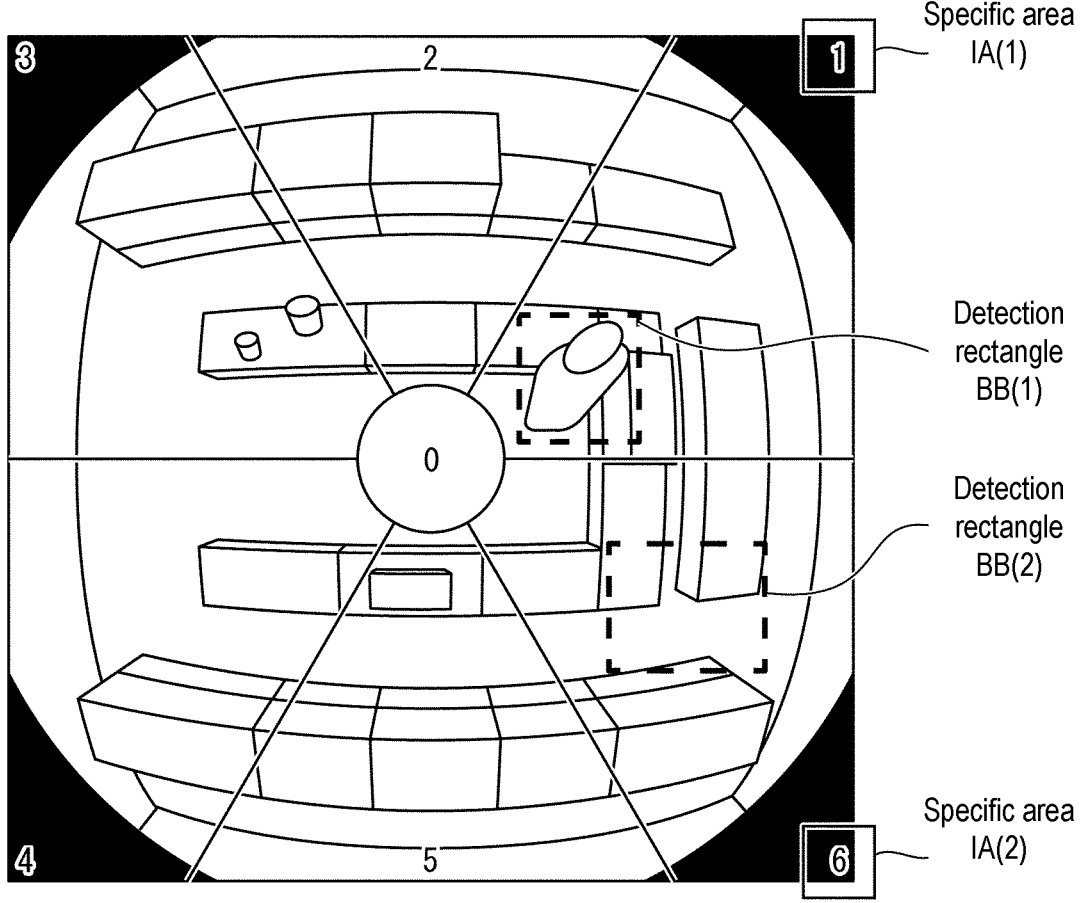
FIG. 9 is a diagram showing an example of a specific area specified by the detection device in FIG. 1.

FIG. 9 is a diagram showing an example of the specific area IA specified by the detection device 10 (particularly, the specification part 170). The detection device 10 (particularly, the division part 120) divides the captured image PI exemplified in FIG. 9 into seven areas AR including the area AR(0) to the area AR(6). Then, the detection device 10 (particularly, the specification part 170) specifies the area AR in which the detection rectangle BB is present as a specific area IA for each detection rectangle BB set in the captured image PI. The specification part 170 may specify the position PS (foot position) of the detection target OB surrounded by the detection rectangle BB and specify the area AR including the position PS as the specific area IA of the detection rectangle BB. Specifically, the specification part 170 calculates the position PS (foot position) of the detection target OB from the detection rectangle BB (the position, shape, and size of the detection rectangle BB) and specifies the area AR including the calculated position PS as the specific area IA. The specification part 170 may specify the area AR including the center position (or the position of the center of gravity) of the detection rectangle BB as the specific area IA of the detection rectangle BB.

In the captured image PI exemplified in FIG. 9, two detection rectangles BB are set. Specifically, the detection device 10 (particularly, the estimation part 150 (the trained model 140)) sets the detection rectangle BB(1) and the detection rectangle BB(2) with respect to the captured image PI exemplified in FIG. 9.

The specification part 170 specifies the specific area IA(1) which is the area AR in which the detection rectangle BB(1) is present and the specific area IA(2) which is the area AR in which the detection rectangle BB(2) is present. For example, the specification part 170 specifies "the position PS(1) (foot position) of the detection target OB(1) surrounded by the detection rectangle BB(1)" and "the position PS(2) (foot position) of the detection target OB(2) surrounded by the detection rectangle BB(2)." Specifically, the specification part 170 calculates the position PS(1) from the detection rectangle BB(1) and calculates the position PS(2) from the detection rectangle BB(2). For example, the specification part 170 specifies the center position (or the position of the center of gravity) of the detection rectangle BB(1) as the position PS(1), and specifies the center position (or the position of the center of gravity) of the detection rectangle BB(2) as the position PS(2). Then, the specification part 170 specifies the area AR including the position PS(1) (the center position of the detection rectangle BB(1)) as the specific area IA(1), and specifies the area AR including the position PS(2) (the center position of the detection rectangle BB(2)) as the specific area IA(2).

In the example in FIG. 9, the specification part 170 specifies that the area AR(1) includes the position PS(1) (the center position of the detection rectangle BB(1)) among seven areas AR including the area AR(0) to the area AR(6). Here, the specification part 170 specifies the area AR(1) as the specific area IA(1) of the detection rectangle BB(1).

In addition, the specification part 170 specifies that the area AR(6) includes the position PS(2) (the center position of the detection rectangle BB(2)) among seven areas AR including the area AR(0) to the area AR(6). Here, the specification part 170 specifies the area AR(6) as the specific area IA(2) of the detection rectangle BB(2).

(Example in which First Determination Process is Performed and Estimation Result is Determined to be Correct)

Figure 10:
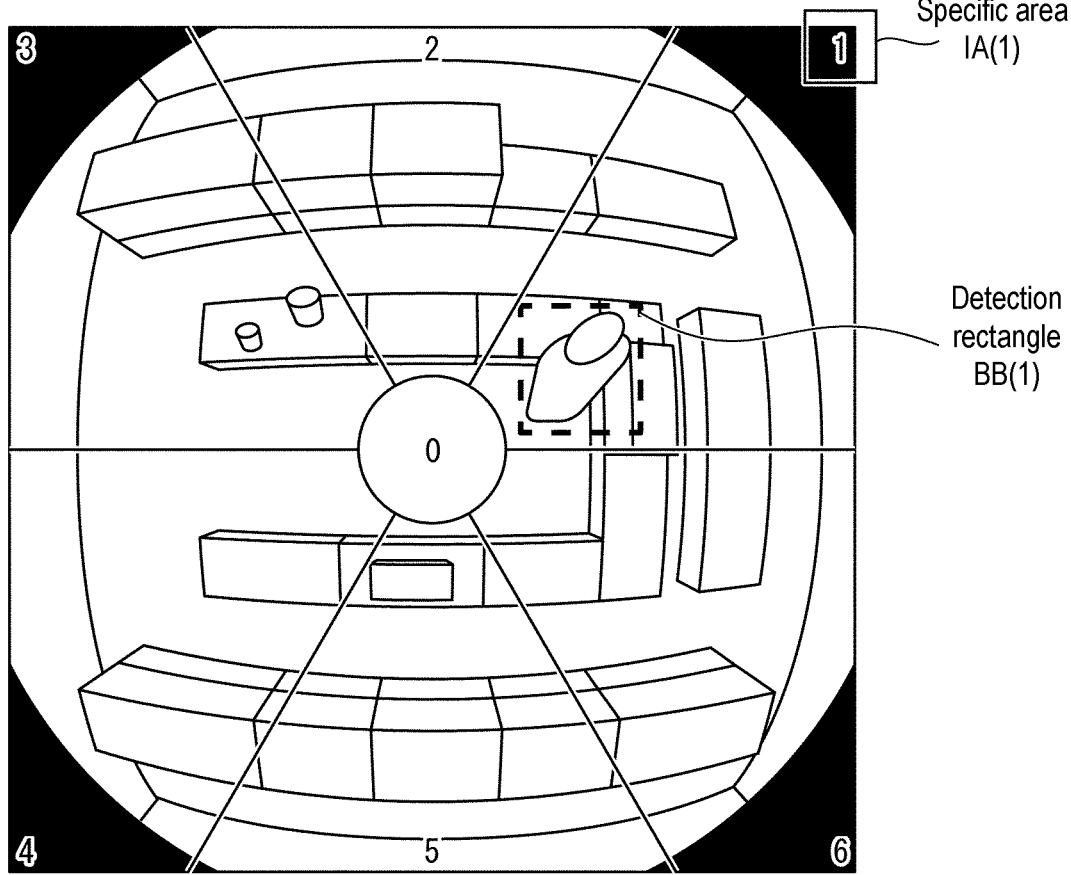
FIG. 10 is a diagram showing an example in which the detection device in FIG. 1 performs the first determination process and determines that the estimation result is correct.

FIG. 10 is a diagram showing an example in which the detection device 10 (particularly, the determination part 190) performs the first determination process and determines that the estimation result is correct. In FIG. 10, the determination part 190 performs the first determination process on the detection rectangle BB(1) between two detection rectangles BB exemplified in FIG. 9, and determines that estimation that the "detection target OB(1) surrounded by the detection rectangle BB(1) is a human (human body)" is correct.

As described with reference to FIG. 9, the detection device 10 (particularly, the specification part 170) specifies that the specific area IA(1) of the detection rectangle BB(1) set in the captured image PI exemplified in FIG. 10 is the area AR(1).

In FIG. 10, the detection device 10 (particularly, the estimation part 150 (the trained model 140)) outputs the class of the "detection target OB(1) surrounded by the detection rectangle BB(1)." That is, the trained model 140 calculates (outputs) the "probability PR of including the position PS(1) where the detection target OB(1) is present" for each of seven areas AR including the area AR(0) to the area AR(6).

In FIG. 10, the trained model 140 calculates that the probability PR(0–1) that the area AR(0) includes the "position PS(1) where the detection target OB(1) is present" is "0.3." The trained model 140 calculates that the probability PR(1–1) that the area AR(1) includes the "position PS(1) where the detection target OB(1) is present" is "0.7." The trained model 140 calculates that the probability PR(2–1) that the area AR(2) includes the "position PS(1) where the detection target OB(1) is present" is "0.05." The trained model 140 calculates that the probability PR(3–1) that the area AR(3) includes the "position PS(1) where the detection target OB(1) is present" is "0.05." The trained model 140 calculates that the probability PR(4–1) that the area AR(4) includes the "position PS(1) where the detection target OB(1) is present" is "0.02." The trained model 140 calculates that the probability PR(5–1) that the area AR(5) includes the "position PS(1) where the detection target OB(1) is present" is "0.075." The trained model 140 calculates that the probability PR(6–1) that the area AR(6) includes the "position PS(1) where the detection target OB(1) is present" is "0.075."

The determination part 190 selects the area AR(1) as the area AR with the highest probability PR of including the "position PS(1) where the detection target OB(1) is present" from among seven areas AR including the area AR(0) to the area AR(6). The determination part 190 confirms whether the "area AR with the highest probability PR(1) of including the 'position PS(1) where the detection target OB(1) is present'" matches the "area AR(1) which is the specific area IA(1)." Then, when the determination part 190 confirms that the area AR with the highest probability PR(1) matches the area AR(1) which is the specific area IA(1), it is determined that estimation that "the detection target OB(1) surrounded by the detection rectangle BB(1) is a human (human body)" is correct.

(Example in which First Determination Process is Performed and Estimation Result is Determined to be Incorrect)

Figure 11:
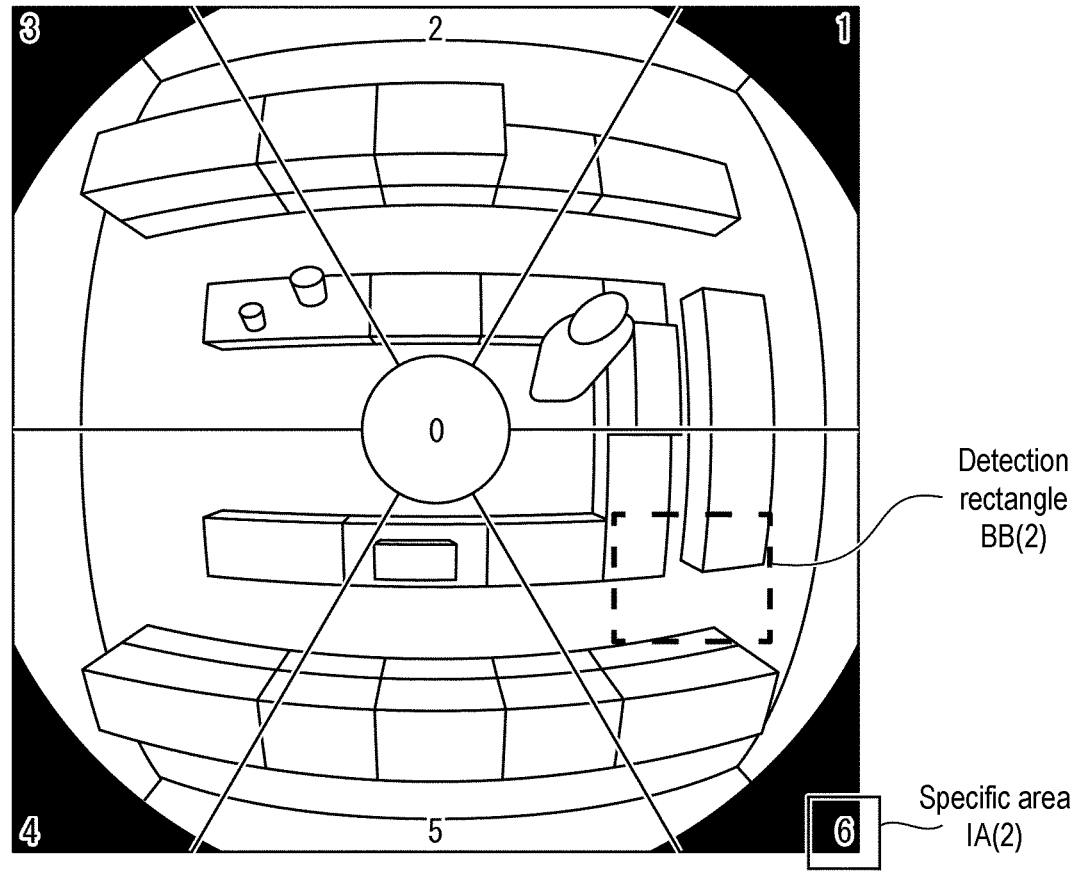
FIG. 11 is a diagram showing an example in which the detection device in FIG. 1 performs the first determination process and determines that the estimation result is incorrect.

FIG. 11 is a diagram showing an example in which the detection device 10 (particularly, the determination part 190) performs the first determination process and determines that the estimation result is incorrect. In FIG. 11, the determination part 190 performs the first determination process on the detection rectangle BB(2) between two detection rectangles BB exemplified in FIG. 9, and determines that estimation that the "detection target OB(2) surrounded by the detection rectangle BB(2) is a human (human body)" is incorrect.

As described with reference to FIG. 9, the detection device 10 (particularly, the specification part 170) specifies that the specific area IA(2) of the detection rectangle BB(2) set in the captured image PI exemplified in FIG. 11 is the area AR(6).

In FIG. 11, the detection device 10 (particularly, the estimation part 150 (the trained model 140)) outputs the class of the "detection target OB(2) surrounded by the detection rectangle BB(2)." That is, the trained model 140 calculates (outputs) the "probability PR of including the position PS(2) where the detection target OB(2) is present" for each of seven areas AR including the area AR(0) to the area AR(6).

In FIG. 11, the trained model 140 calculates that the probability PR(0–2) that the area AR(0) includes "position PS(2) where the detection target OB(2) is present" is "0.1." The trained model 140 calculates that the probability PR(1–2) that the area AR(1) includes the "position PS(2) where the detection target OB(2) is present" is "0.2." The trained model 140 calculates that the probability PR(2–2) that the area AR(2) includes the "position PS(2) where the detection target OB(2) is present" is "0.3." The trained model 140 calculates that the probability PR(3–2) that the area AR(3) includes the "position PS(2) where the detection target OB(2) is present" is "0.1." The trained model 140 calculates that the probability PR(4–2) that the area AR(4) includes the "position PS(2) where the detection target OB(2) is present" is "0.05." The trained model 140 calculates that the probability PR(5–2) that the area AR(5) includes the "position PS(2) where the detection target OB(2) is present" is "0.05." The trained model 140 calculates that the probability PR(6–2) that the area AR(6) includes the "position PS(2) where the detection target OB(2) is present" is "0.2."

The determination part 190 selects the area AR(2) as the area AR with the highest probability PR of including the "position PS(2) where the detection target OB(2) is present" from among seven areas AR including the area AR(0) to the area AR(6). The determination part 190 confirms whether the "area AR with the highest probability PR(2) of including the 'position PS(2) where the detection target OB(2) is present'" matches the "area AR(6) which is the specific area IA(2)." Then, it is confirmed that the area AR with the highest probability PR(2) does not match the area AR(6) which is the specific area IA(2), the determination part 190 determines that estimation that the "detection target OB(2) surrounded by the detection rectangle BB(2) is a human (human body)" is incorrect.

As described with reference to FIG. 10 and FIG. 11, in the detection device 10, for example, if the specific area IA matches "the area AR with the highest probability PR among the plurality of areas AR," the determination part 190 determines that the "detection target OB is a human."

According to the above configuration, if the "area AR (that is, the specific area IA) in which the detection rectangle BB surrounding the detection target OB estimated to be a human is present" matches the "area AR with the highest probability PR among the plurality of areas AR," the detection device 10 determines that "the detection target OB is a human." That is, the detection device 10 determines that "the detection target OB is a human" if the specific area IA matches "the area AR with the highest probability PR of including the position PS where the detection target OB estimated to be a human is present."

When the detection target OB estimated to be a human is actually a human, the possibility that the specific area IA, which is the area AR in which the detection rectangle BB surrounding the detection target OB is present, matches the "area AR with the highest probability PR of including the position PS where the detection target OB is present" is considered to be high.

Here, if the specific area IA matches the "area AR with the highest probability PR among the plurality of areas AR," the detection device 10 determines that the "detection target OB is a human."

Therefore, the detection device 10 has an effect of being able to detect a human from the image captured using a fish-eye lens (captured image PI) with high accuracy.

When the specification part 170 specifies, as the specific area IA, the position PS (foot position) of the "detection target OB which is surrounded by the detection rectangle BB and estimated to be a 'human'," the determination part 190 may determine whether "the foot position is included in the area AR with the highest probability PR." If the foot position is included in the area with the highest probability PR, the determination part 190 may determine that "the detection target OB is a human."

(Modified Example of First Determination Process)

In the example described with reference to FIG. 10 and FIG. 11, the determination part 190 verifies the correctness of estimation that "the detection target OB surrounded by the detection rectangle BB is a human (human body)" by confirming the following two matches. That is, the determination part 190 verifies the correctness of estimation according to match/mismatch of the area AR with the highest probability PR of including "the position PS where the detection target OB surrounded by the detection rectangle BB is present" with the specific area IA which is the area AR in which the detection rectangle BB is present.

Figure 12:
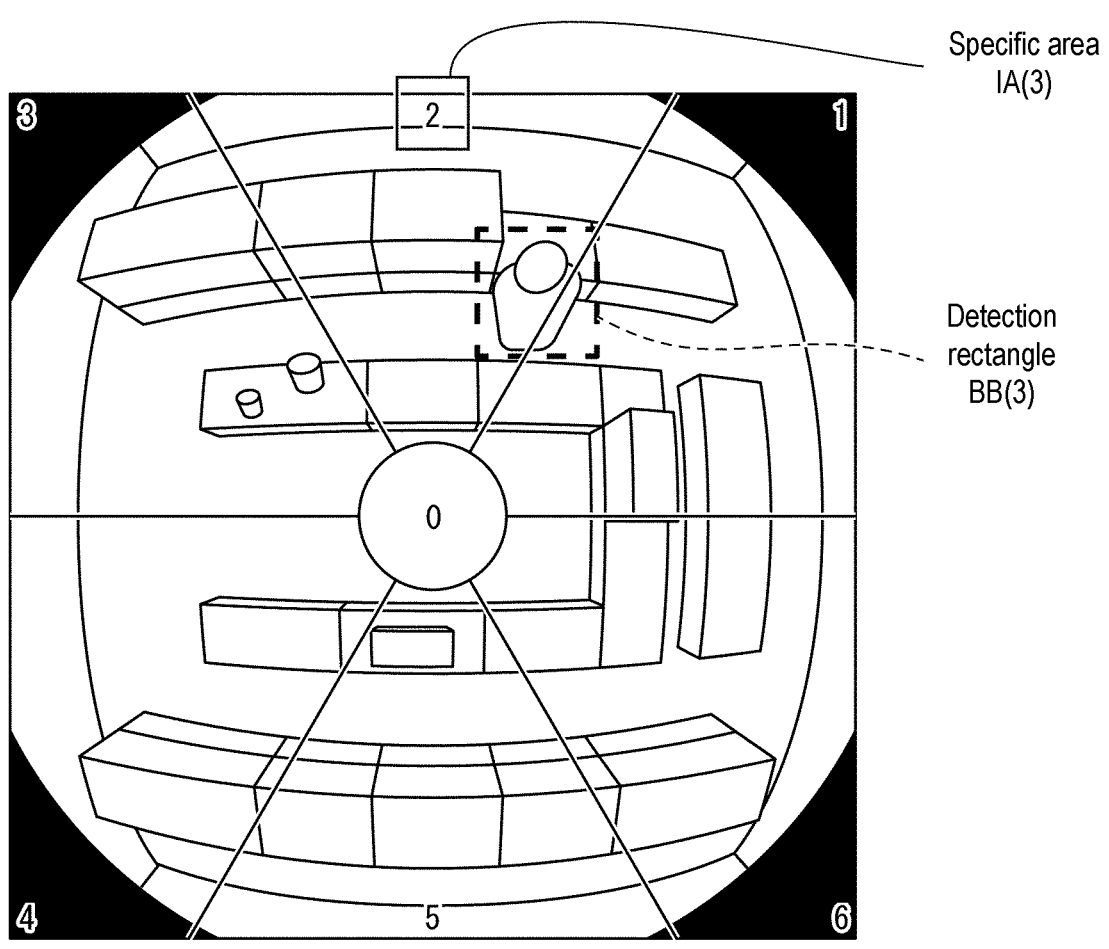
FIG. 12 is a diagram showing an example in which there is a human near boundary lines of a plurality of areas.

However, as exemplified in FIG. 12, if the detection target OB estimated to be a "human" is present near boundary lines of a plurality of areas AR, even though estimation is correct, the area AR with the highest probability PR may not match the specific area IA.

FIG. 12 is a diagram showing an example of a captured image PI in which the detection target OB estimated to be a "human" is present near boundary lines of a plurality of areas AR. The detection device 10 (particularly, the division part 120) divides the captured image PI exemplified in FIG. 12 into seven areas AR including the area AR(0) to the area AR(6).

In FIG. 12, the estimation part 150 (the trained model 140) sets one detection rectangle BB surrounding the detection target OB estimated to be a "human (human body)" in the captured image PI divided into seven areas AR including the area AR(0) to the area AR(6). Specifically, the trained model 140 sets the detection rectangle BB(3) in the captured image PI.

In FIG. 12, the detection device 10 (particularly, the specification part 170) specifies that the specific area IA(3), which is the area AR in which the detection rectangle BB(3) is present among seven areas AR including the area AR(0) to the area AR(6), is the area AR(2). For example, the specification part 170 calculates the position PS(3) (foot position) of the detection target OB(3) from the detection rectangle BB(3) and specifies the area AR(2), which is the area AR including the calculated position PS(3), as the specific area IA(3). The specification part 170 may specify the area AR(2), which is the area AR including the center position (or the position of the center of gravity) of the detection rectangle BB(3), as the specific area IA(3).

Figure 13:
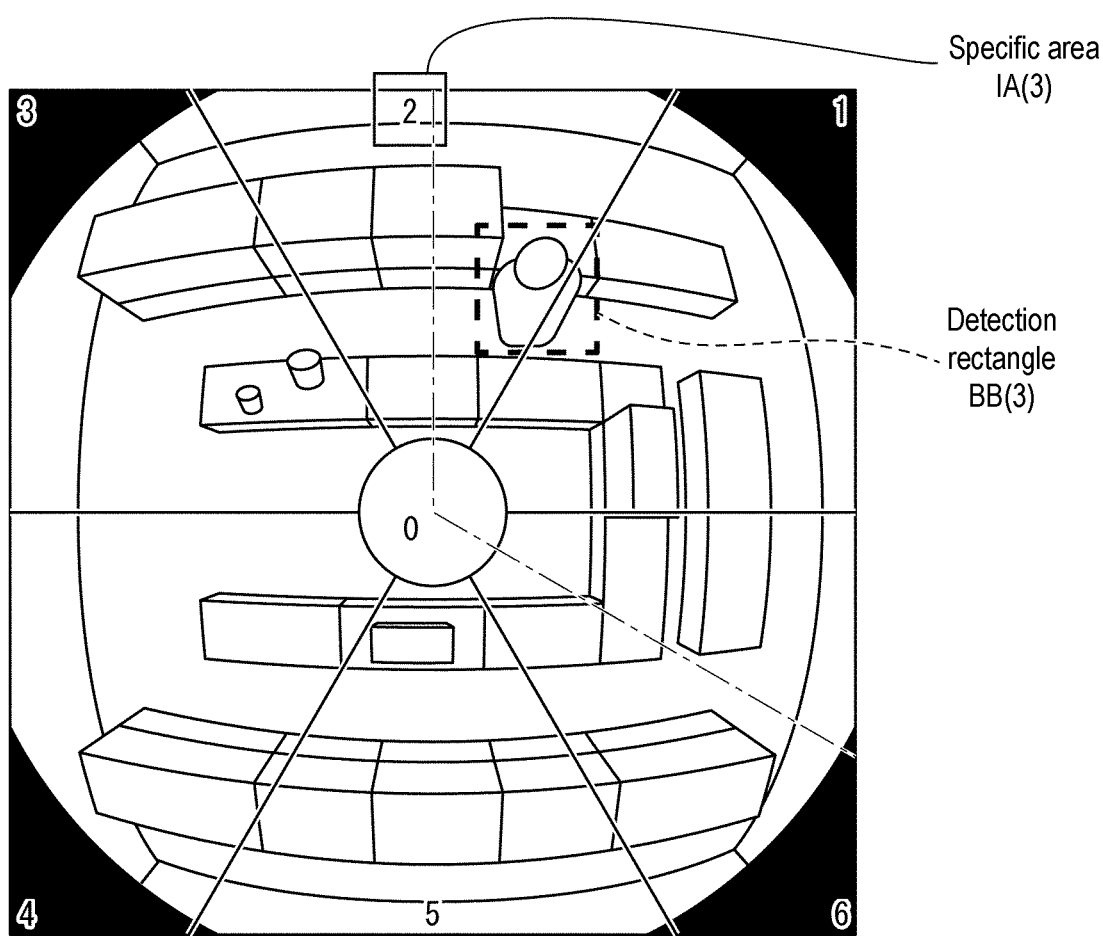
FIG. 13 is a diagram showing an example in which the detection device in FIG. 1 performs the first determination process, and determines that the estimation result is correct even if there is a human near boundary lines of a plurality of areas.

FIG. 13 is a diagram showing an example in which, even if the area AR with the highest probability PR does not match the specific area IA, the detection device 10 performs the first determination process, and determines that estimation that the "detection target OB surrounded by the detection rectangle BB is a human (human body)" is correct.

As described with reference to FIG. 12, the specification part 170 specifies that the specific area IA(3) of the detection rectangle BB(3) set in the captured image PI exemplified in FIG. 13 is the area AR(2).

In FIG. 13, the detection device 10 (particularly, the estimation part 150 (the trained model 140)) outputs the class of the "detection target OB(3) surrounded by the detection rectangle BB(3)." That is, the trained model 140 calculates (outputs) the "probability PR of including the position PS(3) where the detection target OB(3) is present" for each of seven areas AR including the area AR(0) to the area AR(6).

In FIG. 13, the trained model 140 calculates that the probability PR(0–3) that the area AR(0) includes "the position PS(3) where the detection target OB(3) surrounded by the detection rectangle BB(3) is present" is "0.2." The trained model 140 calculates that the "probability PR(1–3) that the area AR(1) includes the position PS(3) where the detection target OB(3) is present" is "0.45." The trained model 140 calculates that the probability PR(2–3) that the area AR(2) includes the "position PS(3) where the detection target OB(3) is present" is "0.4." The trained model 140 calculates that the probability PR(3–3) that the area AR(3) "includes the position PS(3) where the detection target OB(3) is present" is "0.05." The trained model 140 calculates that the probability PR(4–3) that the area AR(4) includes "the position PS(3) where the detection target OB(3) is present" is "0.02." The trained model 140 calculates that the probability PR(5–3) that the area AR(5) includes "the position PS(3) where the detection target OB(3) is present" is "0.075." The trained model 140 calculates that the probability PR(6–3) that the area AR(6) includes "the position PS(3) where the detection target OB(3) is present" is "0.075."

In FIG. 13, the area AR with the highest probability PR of including the "position PS(3) where the detection target OB(3) is present" is the area AR(1). The area AR with the second highest probability PR of including the "position PS(3) where the detection target OB(3) is present" is the area AR(2), and the area AR(2) is adjacent to the area AR(1). The probability PR(1–3) of the area AR(1) is "0.45" which is equal to or less than "0.5,", and the probability PR(2–3) of the area AR(2) is "0.4," which equal to or less than "0.5."

In FIG. 13, the determination part 190 selects the area AR(1) as the area AR with the highest probability PR of including the "position PS(3) where the detection target OB(3) is present" from among seven areas AR including the area AR(0) to the area AR(6).

Then, the determination part 190 confirms that the area AR with the highest probability PR(1) does not match the area AR(2), which is the specific area IA(3).

Here, in FIG. 13, the determination part 190 further confirms that the area AR adjacent to the area AR with the highest probability PR(1) is the area AR(2).

Then, the determination part 190 determines whether the "area AR(2) adjacent to the area AR with the highest probability PR(1)" matches the "area AR(2) which is the specific area IA(3)." When determination part 190 confirms that the "area AR(2) adjacent to the area AR with the highest probability PR(1)" matches the "the area AR(2) which is the specific area IA(3)," it is determined that the detection rectangle BB(3) is correct. That is, the determination part 190 determines that estimation that the "detection target OB(3) surrounded by the detection rectangle BB(3) is a human (human body)" is correct.

As described with reference to FIG. 13, if the specific area IA matches the "area AR with the highest probability PR" or the "area AR adjacent to the area AR with the highest probability PR," the determination part 190 may determine that the "detection target OB surrounded by the detection rectangle BB" is a human.

In the example shown in FIG. 13, the area AR(1) and the area AR(2) are close to each other (adjacent). Here, among seven areas AR including the area AR(0) to the area AR(6), the area AR with the highest probability PR of including "the position PS(3) where the detection target OB(3) is present" is the area AR(1). In addition, the position PS(3) where "the detection target OB(3), which is surrounded by the detection rectangle BB(3) and estimated to be a 'human (human body)'" is present is near the boundary line between the area AR(1) and the area AR(2).

In such a case, the determination part 190 determines whether the specific area IA(3) of the detection rectangle BB(3) matches the "'area AR with the highest probability PR(1)' or the 'area AR(2) adjacent to the area AR(1)'." Here, if the specific area IA(3) of the detection rectangle BB(3) matches the "'area AR with the highest probability PR(1)' or the 'area AR(2) adjacent to the area AR(1)'," the determination part 190 determines that estimation that the "detection target OB(3) is a human" is correct.

For example, in the example shown in FIG. 13, the determination part 190 determines whether the detection rectangle BB(3) is included in a part indicated by a dashed line in FIG. 13. Then, if it is confirmed that "the detection rectangle BB(3) is included in a part indicated by a dashed line in FIG. 13," the determination part 190 determines that estimation that the "detection target OB(3) is a human" is correct.

The determination part 190 may determine whether the position PS(3) where "the detection target OB(3), which is surrounded by the detection rectangle BB(3) and estimated to be a 'human (human body)'" is present is included in a part indicated by a dashed line in FIG. 13. Specifically, the determination part 190 may determine whether "'the position PS(3) calculated from the detection rectangle BB(3) by the specification part 170' is included in a part indicated by a dashed line in FIG. 13." The determination part 190 may set the center position (or the position of the center of gravity) of the detection rectangle BB(3) as the position PS(3), and determine whether the "position PS(3) is included in a part indicated by a dashed line in FIG. 13." Then, if it is confirmed that "the position PS(3) is included in a part indicated by a dashed line in FIG. 13," the determination part 190 may determine that estimation that "the detection target OB(3) is a human" is correct.

In FIG. 7, in S250, the determination part 190 determines whether "'the position PS (foot position) of the detection target OB surrounded by the detection rectangle BB' is included in the output class (that is, the "area AR with the highest probability PR")." However, in S250, the determination part 190 may determine whether "'the position PS (foot position) of the detection target OB surrounded by the detection rectangle BB' is included in either of the following two areas AR". That is, the determination part 190 may determine whether "the position PS of the detection target OB is included in the "area AR with the highest probability PR" or "the position adjacent to the area AR with the highest probability PR." In other words, the determination part 190 may determine whether the specific area IA of the detection rectangle BB matches the "'area AR with the highest probability PR' or the 'area AR adjacent to the area AR with the highest probability PR'."

The part indicated by a dashed line in FIG. 13 includes the following two regions in addition to the area AR(1). That is, the part includes "a region adjacent to the area AR(1) when the area AR(2) adjacent to the area AR(1) is divided into a plurality of regions" and "a region adjacent to the area AR(1) when the area AR(6) adjacent to the area AR(1) is divided into a plurality of regions."

As described so far, for example, when the detection rectangle BB is set across the area AR(x) and the area AR(y) that are adjacent to each other, the determination part 190 determines the correctness of the class as follows using the specific area IA of the detection rectangle BB. That is, the determination part 190 determines whether the specific area IA of the detection rectangle BB (that is, the area AR(x) or the area AR(y)) matches the "area AR with the highest probability PR" or the "area AR adjacent to the area AR with the highest probability PR."

In other words, when the position PS of the detection target OB calculated from the detection rectangle BB is near the boundary line between the area AR(x) and the area AR(y) that are adjacent to each other, the determination part 190 determines the correctness of the class as follows using the specific area IA of the detection rectangle BB. That is, the determination part 190 determines whether the specific area IA (that is, the area AR(x) of the detection rectangle BB or the area AR(y)) matches the "area AR with the highest probability PR" or the "area AR adjacent to the area AR with the highest probability PR." "Near the boundary line" may be a buffer area BA, which will be described below with reference to FIG. 18. The position PS is calculated from the detection rectangle BB (the position, shape, and size of the detection rectangle BB) and may be, for example, the center position (or the position of the center of gravity) of the detection rectangle BB.

When the detection rectangle BB is set across the area AR(x) and the area AR(y) that are adjacent to each other, the specific area IA of the detection rectangle BB is considered to be the area AR(x) or the area AR(y). In addition, the "area AR with the highest probability PR" is either the area AR(x) or the area AR(y), and the "area AR adjacent to the area AR with the highest probability PR" is considered to be the area AR(y) or the area AR(x).

The processes of the determination part 190 that have been described with reference to FIG. 13 can be summarized as follows. That is, for example, if the specific area IA matches the "area AR with the highest probability PR among the plurality of areas AR" or the "area AR adjacent to the area AR with the highest probability PR among the plurality of areas AR," the determination part 190 determines that the detection target OB is a human.

According to the above configuration, if the specific area IA matches the "area AR with the highest probability PR among the plurality of areas AR" or the "area AR adjacent to the area AR with the highest probability PR among the plurality of areas AR," the detection device 10 determines that "the detection target OB is a human."

Here, in the captured image PI, a condition in which a human is imaged across two areas AR among the plurality of areas AR or the position where a human is imaged is near the boundary between two areas AR is assumed.

Under such a condition, when the detection target OB estimated to be a human is actually a human, it is considered that the specific area IA, which is the area AR in which the detection rectangle BB surrounding the detection target OB is present, is highly likely to match any of the following areas AR. That is, it is considered that the specific area IA is highly likely to match the "area AR with the highest probability PR among the plurality of areas AR" or the "area AR adjacent to the area AR with the highest probability PR among the plurality of areas AR."

Here, if the specific area IA matches the "area AR with the highest probability PR among the plurality of areas AR," the detection device 10 determines that "the detection target OB is a human." In addition, if the specific area IA matches the "area AR adjacent to the area AR with the highest probability PR among the plurality of areas AR," the detection device 10 determines that the "detection target OB is a human."

Therefore, the detection device 10 has an effect of being able to detect a human from the captured image PI with high accuracy even if a human is imaged near the boundary between two areas AR among the plurality of areas AR in the captured image PI.

When the specification part 170 specifies the foot position as the specific area IA, the determination part 190 may determine whether the foot position is included in the "area AR with the highest probability PR" or the "area AR adjacent to the area AR with the highest probability PR." If the foot position is included in the "area AR with the highest probability PR" or the "area AR adjacent to the area AR with the highest probability PR," the determination part 190 determines that the "detection target OB is a human."

(Example of Human Detection Process Including Second Determination Process)

Figure 14:
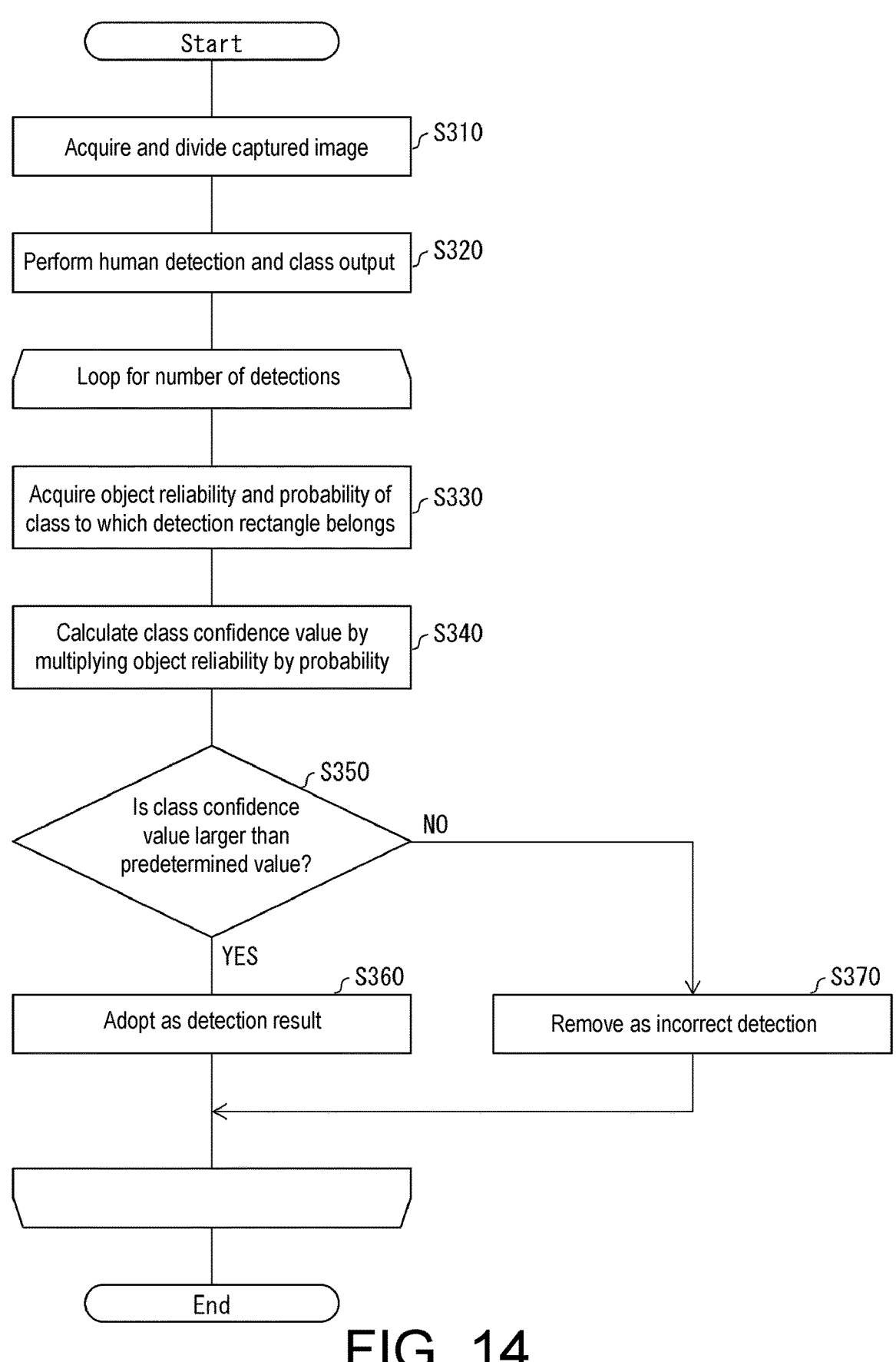
FIG. 14 is a flowchart illustrating an example of a human detection process in which a second determination process is performed on the output of the trained model generated in FIG. 4 to detect a human.

FIG. 14 is a flowchart illustrating an example of a human detection process in which a second determination process is performed on the output of the trained model 140 to detect a human. The processes S310 and S320 in the second determination process exemplified in FIG. 14 are the same as the processes S210 and S220 in the first determination process exemplified in FIG. 7.

That is, the image acquisition part 110 acquires a captured image PI, and the division part 120 divides the captured image PI acquired by the image acquisition part 110 into a plurality of areas AR (S310). The estimation part 150 refers to the divided image information 130 and performs human detection and class output on the acquired captured image PI (the captured image PI divided into a plurality of areas AR) using the trained model 140 (S320).

The detection device 10 performs processes S330 to S370 corresponding to the number of humans detected from the captured image PI by the estimation part 150, in other words, the number of detection rectangles BB set by the estimation part 150 for each detection rectangle BB (that is, for each detection target OB).

The determination part 190 refers to the object reliability table 163 and the probability table 162, and acquires, for each detection rectangle BB (that is, for each detection target OB), the object reliability OR, and the probability PR of the class (that is, the area AR corresponding to the specific area IA) to which the detection rectangle BB belongs (S330).

Specifically, the determination part 190 refers to the object reliability table 163 and acquires an object reliability OR for each detection rectangle BB. In addition, the determination part 190 refers to the specific area table 180 and acquires a specific area IA for each detection rectangle BB. Then, the determination part 190 refers to the probability table 162 and acquires the probability PR of the area AR corresponding to the acquired specific area IA.

For each detection rectangle BB, the determination part 190 multiplies the object reliability OR of the detection rectangle BB by the probability PR of "the area AR corresponding to the specific area IA of the detection rectangle BB" to calculate the class confidence value CR of the detection rectangle BB (S340). Then, the determination part 190 determines whether the "class confidence value CR of the detection rectangle BB is larger than a predetermined value TH" (S350).

If "the class confidence value CR of the detection rectangle BB is larger than a predetermined value TH" (YES in S350), the determination part 190 adopts the detection rectangle BB as the correct detection result (S360). That is, the determination part 190 determines that "the class confidence value CR of the detection rectangle BB is larger than a predetermined value TH" and that "estimation that 'the detection target OB surrounded by the detection rectangle BB is a human' is correct."

Figure 15:
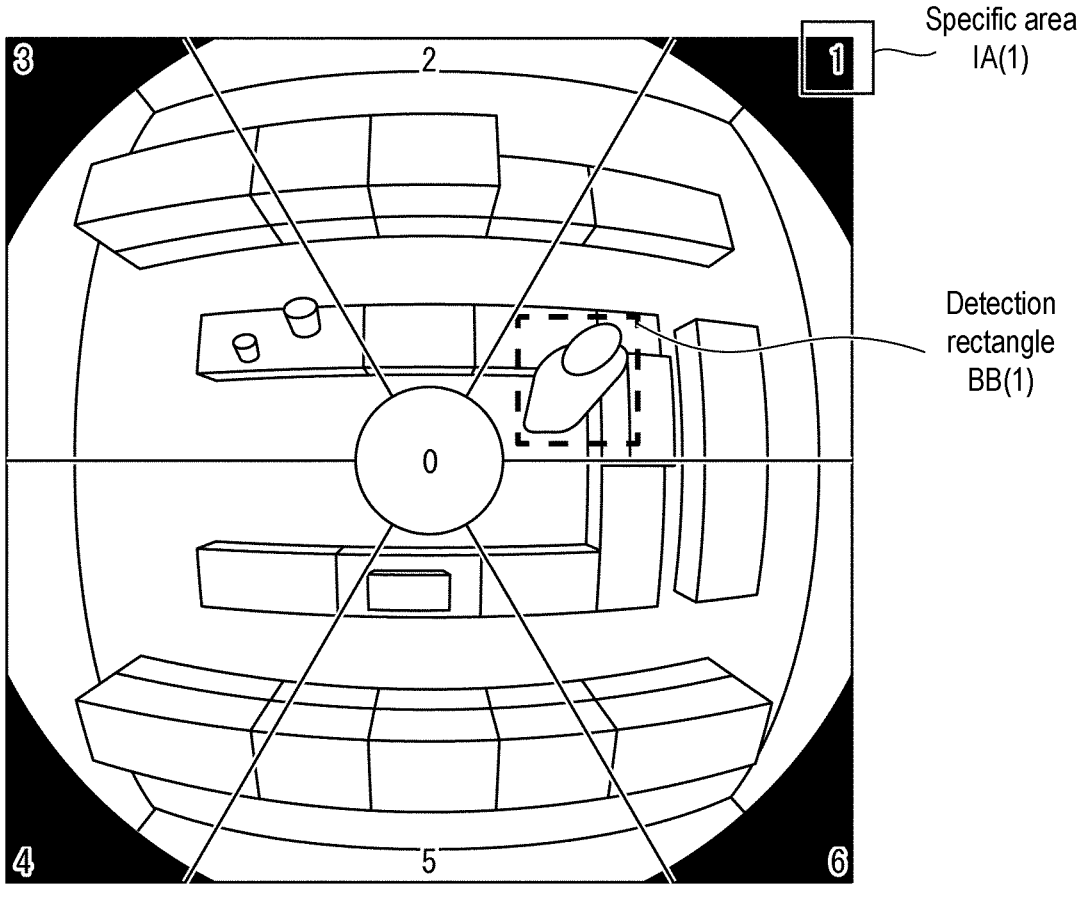
FIG. 15 is a diagram showing an example in which the detection device in FIG. 1 performs the second determination process and determines that the estimation result is correct.

If "the class confidence value CR of the detection rectangle BB is equal to or less than a predetermined value TH" (NO in S350), the determination part 190 removes the detection rectangle BB as an incorrect detection (S370). That is, the determination part 190 determines that "the class confidence value CR of the detection rectangle BB is equal to or less than a predetermined value TH" and that "estimation that 'the detection target OB surrounded by the detection rectangle BB is a human' is incorrect." (Example in which second determination process is performed and estimation result is determined to be correct) FIG. 15 is a diagram showing an example in which the detection device 10 (particularly, the determination part 190) performs the second determination process and determines that the estimation result is correct. In FIG. 15, the determination part 190 performs the second determination process on the detection rectangle BB(1) set in the captured image PI exemplified in FIG. 15, and determines that estimation that "the detection target OB(1) surrounded by the detection rectangle BB(1) is a human (human body)" is correct.

As described with reference to FIG. 9, the detection device 10 (particularly, the specification part 170) specifies that the specific area IA(1) of the detection rectangle BB(1) set in the captured image PI exemplified in FIG. 15 is the area AR(1).

In FIG. 15, the detection device 10 (particularly, estimation part 150 (the trained model 140)) outputs the class of the "detection target OB(1) surrounded by the detection rectangle BB(1)." That is, the trained model 140 calculates (outputs) the "probability PR of including the position PS(1) where the detection target OB(1) is present" for each of seven areas AR including the area AR(0) to the area AR(6).

In FIG. 15, the trained model 140 calculates that the "probability PR(0–1) that the area AR(0) includes the position PS(1) where the detection target OB(1) is present" is "0." The trained model 140 calculates that "the probability PR(1–1) that the area AR(1) includes the position PS(1) where the detection target OB(1) is present" is "0.4." The trained model 140 calculates that the "probability PR(2–1) that the area AR(2) includes the position PS(1) where the detection target OB(1) is present" is "0.005." The trained model 140 calculates that the "probability PR(3–1) that the area AR(3) includes the position PS(1) where the detection target OB(1) is present" is "0.45." The trained model 140 calculates that the "probability PR(4–1) that the area AR(4) includes the position PS(1) where the detection target OB(1)

is present" is "0.005." The trained model 140 calculates that the "probability PR(5–1) that the area AR(5) includes the position PS(1) where the detection target OB(1) is present" is "0.14." The trained model 140 calculates that the "probability PR(6–1) that the area AR(6) includes the position PS(1) where the detection target OB(1) is present" is "0."

In addition, in FIG. 15, the trained model 140 calculates the object reliability OR(1) of the detection rectangle BB(1) as "920."

The determination part 190 multiplies the probability PR(1–1) of "the area AR(1) corresponding to 'the specific area IA(1) specified for the detection rectangle BB(1)'" by the object reliability OR(1) of the detection rectangle BB(1) to calculate the class confidence value CR(1) of the detection rectangle BB(1). That is, the determination part 190 multiplies the "probability PR(1–1) of the area AR(1): 0.4" by "the object reliability OR(1) of the detection rectangle BB(1): 920" to calculate the "class confidence value CR(1) of the detection rectangle BB(1): 368."

It is confirmed whether the class confidence value CR of the detection rectangle BB is larger than a predetermined value TH and if it is confirmed that the class confidence value CR of the detection rectangle BB is larger than a predetermined value TH, the determination part 190 determines that estimation that "the detection target OB surrounded by the detection rectangle BB is a human" is correct. For example, if it is confirmed that the "class confidence value CR(1) of the detection rectangle BB(1): 368" is larger than a "predetermined value TH: 350," the determination part 190 determines that estimation that the "detection target OB(1) surrounded by the detection rectangle BB(1) is a human" is correct.

(Example in which Second Determination Process is Performed and Estimation Result is Determined to be Incorrect)

Figure 16:
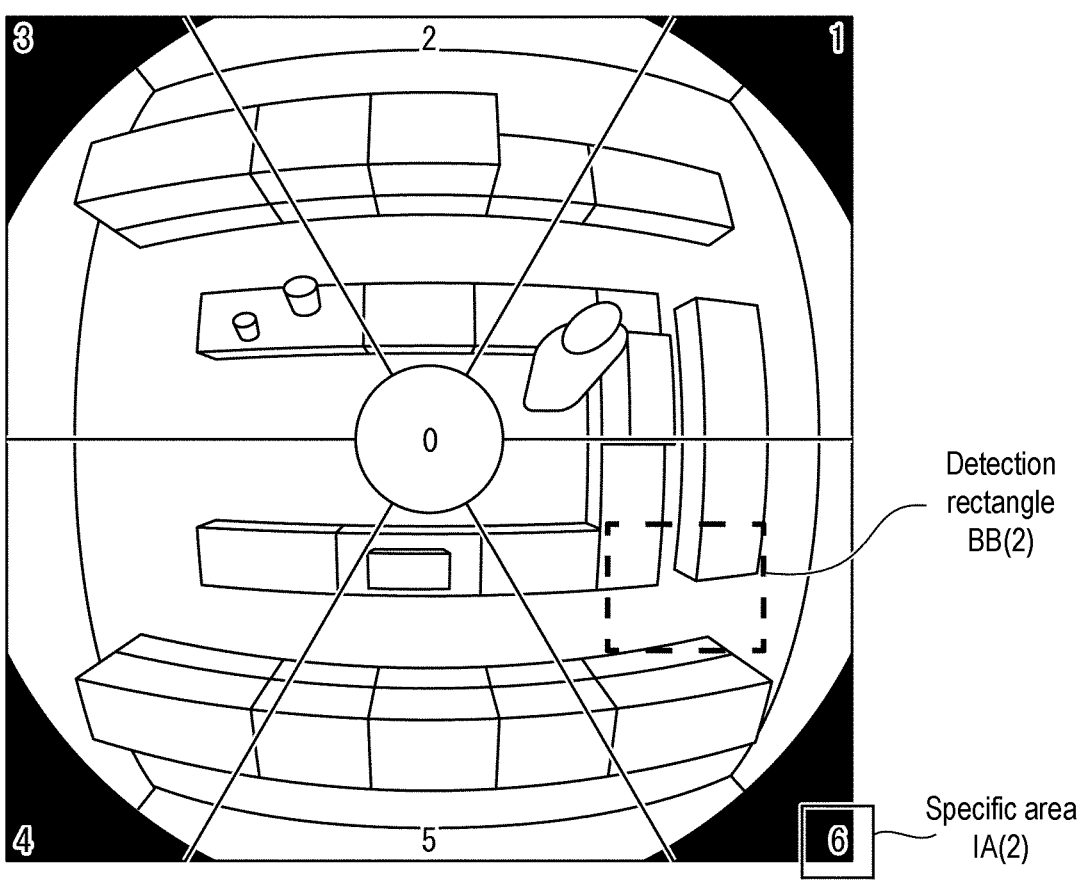
FIG. 16 is a diagram showing an example in which the detection device in FIG. 1 performs the second determination process and determines that the estimation result is incorrect.

FIG. 16 is a diagram showing an example in which the detection device 10 (particularly, the determination part 190) performs the second determination process and determines that the estimation result is incorrect. In FIG. 16, the determination part 190 performs the second determination process on the detection rectangle BB(2) set in the captured image PI exemplified in FIG. 16, and determines that estimation that the "detection target OB(2) surrounded by the detection rectangle BB(2) is a human (human body)" is incorrect.

As described with reference to FIG. 9, the detection device 10 (particularly, the specification part 170) specifies that the specific area IA(2) of the detection rectangle BB(2) set in the captured image PI exemplified in FIG. 16 is the area AR(6).

In FIG. 16, the detection device 10 (particularly, the estimation part 150 (the trained model 140)) outputs the class of the "detection target OB(2) surrounded by the detection rectangle BB(2)." That is, the trained model 140 calculates (outputs) the "probability PR of including the position PS(2) where the detection target OB(2) is present" for each of seven areas AR including the area AR(0) to the area AR(6).

In FIG. 16, the trained model 140 calculates that the probability PR(0–2) that the area AR(0) includes "position PS(2) where the detection target OB(2) is present" is "0.1." The trained model 140 calculates that the probability PR(1–2) that the area AR(1) includes the "position PS(2) where the detection target OB(2) is present" is "0.2." The trained model 140 calculates that the probability PR(2–2) that the area AR(2) includes the "position PS(2) where the detection target OB(2) is present" is "0.3." The trained model 140 calculates that the probability PR(3–2) that the area AR(3)

includes the "position PS(2) where the detection target OB(2) is present" is "0.1." The trained model 140 calculates that the probability PR(4–2) that the area AR(4) includes the "position PS(2) where the detection target OB(2) is present" is "0.05." The trained model 140 calculates that the probability PR(5–2) that the area AR(5) includes the "position PS(2) where the detection target OB(2) is present" is "0.05." The trained model 140 calculates that the probability PR(6–2) that the area AR(6) includes the "position PS(2) where the detection target OB(2) is present" is "0.2."

In addition, in FIG. 16, the trained model 140 calculates the object reliability OR(2) of the detection rectangle BB(2) as "625."

The determination part 190 multiplies the probability PR(6–2) of "the area AR(6) corresponding to 'the specific area IA(2) specified for the detection rectangle BB(2)'" by the object reliability OR(2) of the detection rectangle BB(2) to calculate the class confidence value CR(2) of the detection rectangle BB(2). That is, the determination part 190 multiplies the "probability PR(6–2) of the area AR(6): 0.2" by the "object reliability OR(2) of the detection rectangle BB(2): 625" to calculate "the class confidence value CR(2) of the detection rectangle BB(2): 125."

It is confirmed that the class confidence value CR of the detection rectangle BB is larger than a predetermined value TH and if it is confirmed that the class confidence value CR of the detection rectangle BB is equal to or less than a predetermined value TH, the determination part 190 determines that "estimation that the detection target OB surrounded by the detection rectangle BB is a human" is incorrect. For example, if it is confirmed that "the class confidence value CR(2) of the detection rectangle BB(2): 125" is equal to or less than a "predetermined value TH: 350," the determination part 190 determines that estimation that the "detection target OB(2) surrounded by the detection rectangle BB(2) is a human" is incorrect.

The processes of the determination part 190 that have been described with reference to FIG. 15 and FIG. 16 can be summarized as follows. That is, for example, if the class confidence value CR calculated by multiplying the probability PR of "the area AR corresponding to the specific area IA among the plurality of areas AR" by the object reliability OR of the detection rectangle BB is larger than a predetermined value TH, the determination part 190 determines that the "detection target OB is a human." The object reliability OR of the detection rectangle BB is a value indicating the degree of possibility that a certain object is surrounded by the detection rectangle BB.

According to the above configuration, if the class confidence value CR calculated by multiplying the probability PR of "the area AR corresponding to the specific area IA among the plurality of areas AR" by the object reliability OR of the detection rectangle BB is larger than a predetermined value TH, the detection device 10 determines that the "detection target OB is a human."

When the detection target OB estimated to be a human is actually a human, "the probability PR that 'the specific area IA which is the area AR in which the detection rectangle BB surrounding the detection target OB is present' includes the 'position PS where the detection target OB is present'" is considered to be sufficiently high. In addition, when the detection target OB estimated to be a human is actually a human, the object reliability OR of the detection rectangle BB, which is a value indicating the degree of possibility that a certain object is surrounded by the "detection rectangle BB surrounding the detection target OB," is also considered to be a sufficiently high value.

Here, if the class confidence value CR calculated by multiplying the "probability PR of the area AR corresponding to the specific area IA among the plurality of areas AR" by the object reliability OR of the detection rectangle BB is larger than a predetermined value TH, the detection device 10 determines that the "detection target OB is a human."

Therefore, the detection device 10 has an effect of being able to detect a human from an image captured using a fish-eye lens (captured image PI) with high accuracy.

When the specification part 170 specifies the foot position as the specific area IA, the determination part 190 may determine that the "detection target OB is a human" if the class confidence value CR calculated by multiplying the probability PR of the area AR including the foot position by the object reliability OR is larger than a predetermined value TH.

(Modified Example of Second Determination Process)

In the example described with reference to FIG. 15 and FIG. 16, the determination part 190 multiplies the probability PR of the "area AR corresponding to the 'specific area IA specified for the detection rectangle BB'" by the object reliability OR of the detection rectangle BB to calculate the class confidence value CR of the detection rectangle BB. Then, the determination part 190 determines whether the calculated class confidence value CR is larger than a predetermined value TH. If the calculated class confidence value CR is larger than a predetermined value TH, the determination part 190 determines that estimation that "the detection target OB surrounded by the detection rectangle BB is a human" is correct. If the calculated class confidence value CR is equal to or less than a predetermined value TH, the determination part 190 determines that "estimation that the detection target OB surrounded by the detection rectangle BB is a human" is incorrect.

Figure 17:
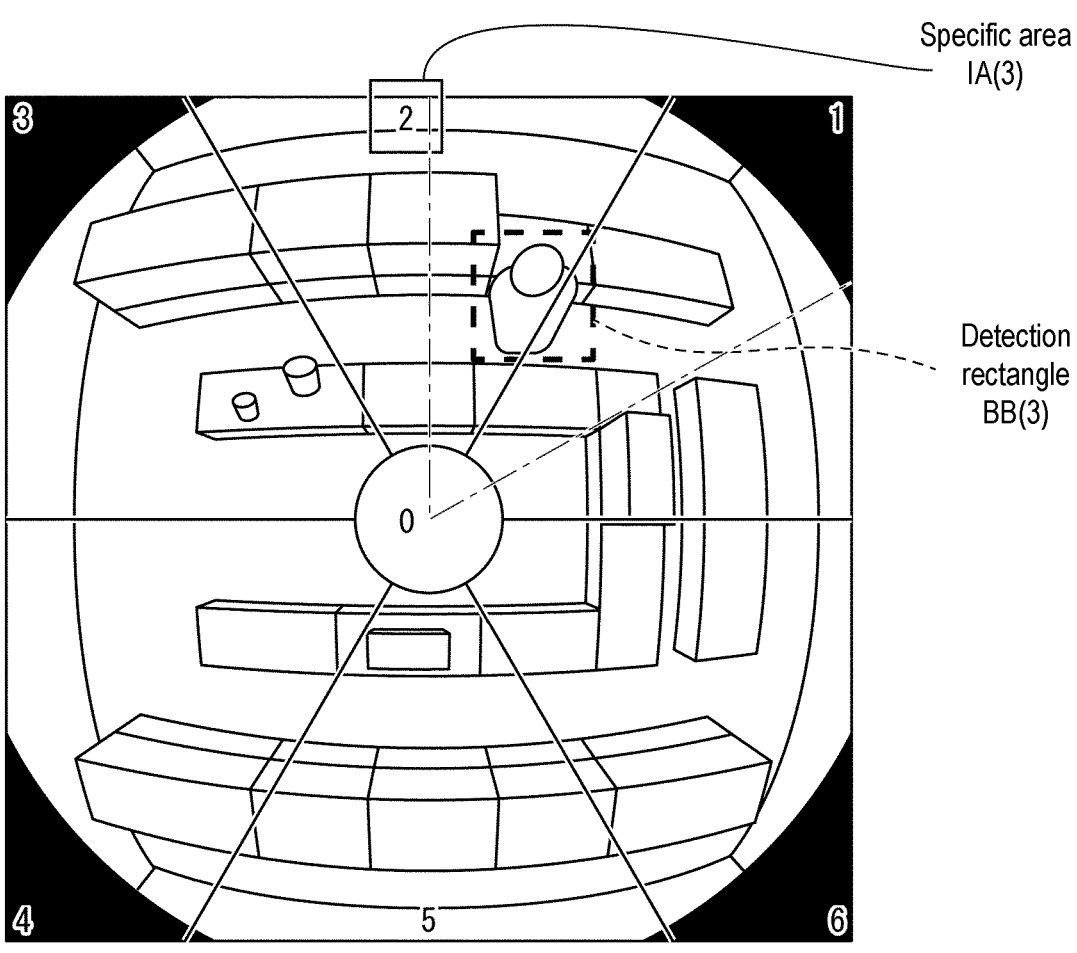
FIG. 17 is a diagram showing an example in which the detection device in FIG. 1 performs the second determination process and determines that the estimation result is correct even if the position where a detection target is present is near boundary lines of a plurality of areas.

However, as exemplified in FIG. 17, if the detection target OB estimated to be a "human" is present near boundary lines of a plurality of areas AR, even though estimation is correct, the class confidence value CR of the detection rectangle BB may be equal to or less than a predetermined value TH because the probability PR is small. That is, if the detection rectangle BB spans two areas AR among the plurality of areas AR, even though the detection target OB surrounded by the detection rectangle BB is a human, the class confidence value CR of the detection rectangle BB may be equal to or less than a predetermined value TH because the probability PR is small.

FIG. 17 is a diagram showing an example in which the detection device 10 (particularly, the determination part 190) performs the second determination process and determines that the estimation result is correct even if the detection rectangle BB (in other words, the position PS where the detection target OB is present) is present near boundary lines of a plurality of areas AR. In the example shown in FIG. 17, the detection rectangle BB(3) is set across the area AR(1) and the area AR(2) that are adjacent to each other. In other words, the position PS(3) of the detection target OB(3) surrounded by the detection rectangle BB(3) is near boundary line between the area AR(1) and the area AR(2). The position PS(3) is calculated from the detection rectangle BB(3), and may be, for example, the center position or the position of the center of gravity of the detection rectangle BB(3).

In FIG. 17, the detection device 10 (particularly, the division part 120) divides the captured image PI into seven areas AR including the area AR(0) to the area AR(6). In addition, in FIG. 17, the estimation part 150 (the trained model 140) sets one detection rectangle BB surrounding the detection target OB estimated to be a "human (human body)" in the captured image PI divided into seven areas AR including the area AR(0) to the area AR(6). Specifically, the trained model 140 sets the detection rectangle BB(3) in the captured image PI. In addition, in FIG. 17, the detection device 10 (particularly, the specification part 170) specifies that the specific area IA(3) which is the area AR in which the detection rectangle BB(3) is present among seven areas AR including the area AR(0) to the area AR(6), is the area AR(2). The specification part 170 calculates the position PS(3) of the detection target OB(3) surrounded by the detection rectangle BB(3) (foot position) from the detection rectangle BB(3). Then, the specification part 170 specifies the area AR(2), which is the area AR including the calculated position PS(3), as the specific area IA(3). For example, the specification part 170 may specify the area AR(2), which is the area AR including the center position (or the position of the center of gravity) of the detection rectangle BB(3), as the specific area IA(3).

In FIG. 17, the detection device 10 (particularly, the estimation part 150 (the trained model 140)) outputs the class of the "detection target OB(3) surrounded by the detection rectangle BB(3)." That is, the trained model 140 calculates (outputs) the "probability PR of including the position PS(3) where the detection target OB(3) is present" for each of seven areas AR including the area AR(0) to the area AR(6).

In FIG. 17, the trained model 140 calculates that the probability PR(0–3) that the area AR(0) includes the "position PS(3) where the detection target OB(3) is present" is "0.3." The trained model 140 calculates that the probability PR(1–3) that the area AR(1) includes the "position PS(3) where the detection target OB(3) is present" is "0.3." The trained model 140 calculates that the probability PR(2–3) that the area AR(2) includes the "position PS(3) where the detection target OB(3) is present" is "0.45." The trained model 140 calculates that the probability PR(3–3) that the area AR(3) "includes the position PS(3) where the detection target OB(3) is present" is "0.05." The trained model 140 calculates that the probability PR(4–3) that the area AR(4) includes "the position PS(3) where the detection target OB(3) is present" is "0.02." The trained model 140 calculates that the probability PR(5–3) that the area AR(5) includes "the position PS(3) where the detection target OB(3) is present" is "0.075." The trained model 140 calculates that the probability PR(6–3) that the area AR(6) includes "the position PS(3) where the detection target OB(3) is present" is "0.075."

In addition, in FIG. 17, the trained model 140 calculates the object reliability OR(3) of the detection rectangle BB(3) as "800."

The determination part 190 calculates an average value of the probability PR(2–3) of the area AR(2), which is the specified specific area IA(3), and the probability PR(1–3) of the area AR(1) adjacent to the area AR(2). That is, the determination part 190 calculates "0.375," which is an average value of "the probability PR(2–3) of the area AR(2): 0.45" and "the probability PR(1–3) of the area AR(1): 0.3."

The determination part 190 multiplies the calculated average value by the object reliability OR(3) of the detection rectangle BB(3) to calculate the class confidence value CR(3) of the detection rectangle BB(3). That is, the determination part 190 multiplies the "average value: 0.375" by the "object reliability OR(3): 800" to calculate the "class confidence value CR(3): 300."

It is confirmed whether the class confidence value CR of the detection rectangle BB is larger than a predetermined value TH, and if it is confirmed that the class confidence value CR of the detection rectangle BB is larger than a predetermined value TH, the determination part 190 determines that estimation that "the detection target OB surrounded by the detection rectangle BB is a human" is correct. For example, if it is confirmed that "the class confidence value CR(3) of the detection rectangle BB(3): 300" is equal to or less than a "predetermined value TH: 250," the determination part 190 determines that estimation that the "detection target OB(3) surrounded by the detection rectangle BB(3) is a human" is correct.

In the example shown in FIG. 17, the detection rectangle BB(3) is present across the area AR(2) which is the specific area IA(3) and the area AR(1) adjacent to the area AR(2), that is, the detection target OB(3) is present near the boundary line between the area AR(2) and the area AR(1). In other words, the position PS(3) of the detection target OB(3) calculated from the detection rectangle BB(3) is near the boundary line between the area AR(2) which is the specific area IA(3) and the area AR(1) adjacent to the area AR(2). For example, the position PS(3) may be the center position or the position of the center of gravity of the detection rectangle BB(3).

Here, the determination part 190 multiplies the average value of the probability PR(2–3) of the area AR(2) and the probability PR(1–3) of the area AR(1) by the object reliability OR(3) of the detection rectangle BB(3) to calculate the class confidence value CR(3) of the detection rectangle BB(3). Then, the determination part 190 determines the correctness of estimation that the "detection target OB(3) surrounded by the detection rectangle BB(3) is a human" according to whether the class confidence value CR(3) of the detection rectangle BB(3) is larger than a predetermined value TH.

If the detection rectangle BB (that is, the position PS of the detection target OB surrounded by the detection rectangle BB) is present near the boundary line between the area AR(x) which is the specific area IA of the detection rectangle BB and the area AR(y) adjacent to the area AR(x), the determination part 190 performs the following process.

That is, the determination part 190 calculates the probability PR(x) that the "area AR(x) includes the position PS of the detection target OB surrounded by the detection rectangle BB" and the probability PR(y) that the "area AR(y) includes the position PS of the detection target OB surrounded by the detection rectangle BB." The determination part 190 multiplies the average value of the probability PR(x) and the probability PR(y) by the object reliability OR of the detection rectangle BB to calculate the class confidence value CR of the detection rectangle BB. Then, the determination part 190 determines the correctness of estimation that "the detection target OB surrounded by the detection rectangle BB is a human" according to whether the class confidence value CR of the detection rectangle BB is larger than a predetermined value TH.

In other words, in S330 exemplified in FIG. 14, the determination part 190 calculates the average value of the probabilities PR of the following two areas AR in place of "the probability PR of the class to which the detection rectangle BB belongs (that is, the probability PR of the area AR which is the specific area IA)." That is, the determination part 190 calculates the average value of the probability PR(x) of the area AR(x) which is the specific area IA and the probability PR(y) of the area AR(y) adjacent to the area AR(x). Then, in S340 exemplified in FIG. 14, the determination part 190 multiplies "the average value of the probability PR(x) and the probability PR(y)" by the object reliability OR of the detection rectangle BB to calculate the class confidence value CR in place of "the probability PR of the area AR which is the specific area IA."

In the example shown in FIG. 15 and FIG. 16, the detection rectangle BB (that is, the position PS of the detection target OB surrounded by the detection rectangle BB) is present at a position away from the boundary lines of the plurality of areas AR, and the predetermined value TH is "350." On the other hand, in the example shown in FIG. 17, the detection rectangle BB (that is, the position PS of the detection target OB surrounded by the detection rectangle BB) is present near the boundary lines of the plurality of areas AR, and the predetermined value TH is "250."

In this manner, the determination part 190 may change the predetermined value TH according to whether "the detection rectangle BB (that is, the position PS of the detection target OB surrounded by the detection rectangle BB) is present near the boundary lines of the plurality of areas AR." In addition, the determination part 190 may set the predetermined value TH to be constant regardless of whether "the detection rectangle BB (that is, the position PS of the detection target OB surrounded by the detection rectangle BB) is present near the boundary lines of the plurality of areas AR.

(Example in which Buffer Area is Set)

Figure 18:
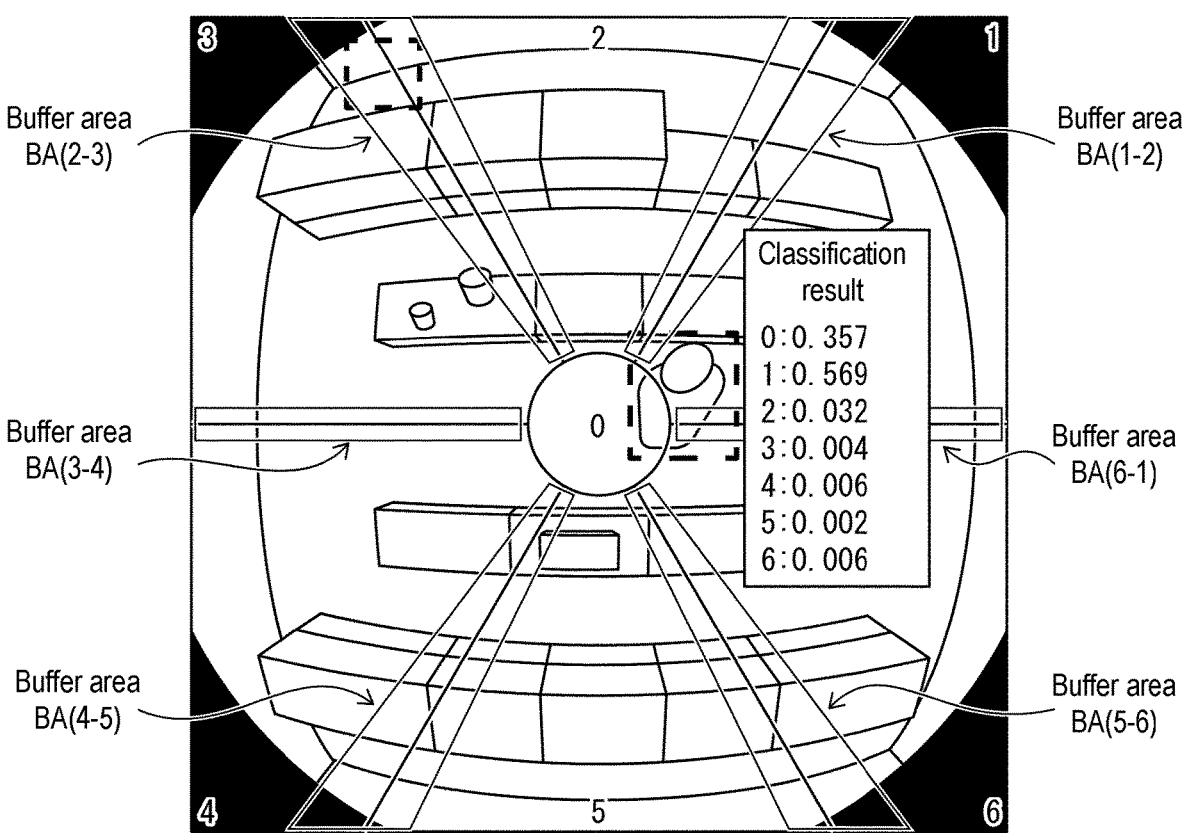
FIG. 18 is a diagram showing an example in which the detection device in FIG. 1 sets buffer areas near boundary lines of a plurality of areas.

FIG. 18 is a diagram showing an example in which the detection device 10 (for example, the division part 120) sets buffer areas BA near boundary lines of a plurality of areas AR in the captured image PI. As shown in FIG. 18, the division part 120 may set buffer areas BA near the boundary lines of the plurality of areas AR. Specifically, the division part 120 may set a buffer area BA(x–y) near the boundary line between the area AR(x) and the area AR(y).

In the example shown in FIG. 18, the division part 120 sets a buffer area BA(1–2) near the boundary line between the area AR(1) and the area AR(2). The division part 120 sets a buffer area BA(2–3) near the boundary line between the area AR(2) and the area AR(3). The division part 120 sets a buffer area BA(3–4) near the boundary line between the area AR(3) and the area AR(4). The division part 120 sets a buffer area BA(4–5) near the boundary line between the area AR(4) and the area AR(5). The division part 120 sets a buffer area BA(5–6) near the boundary line between the area AR(5) and the area AR(6). The division part 120 sets a buffer area BA(6–1) near the boundary line between the area AR(6) and the area AR(1).

Figure 19:
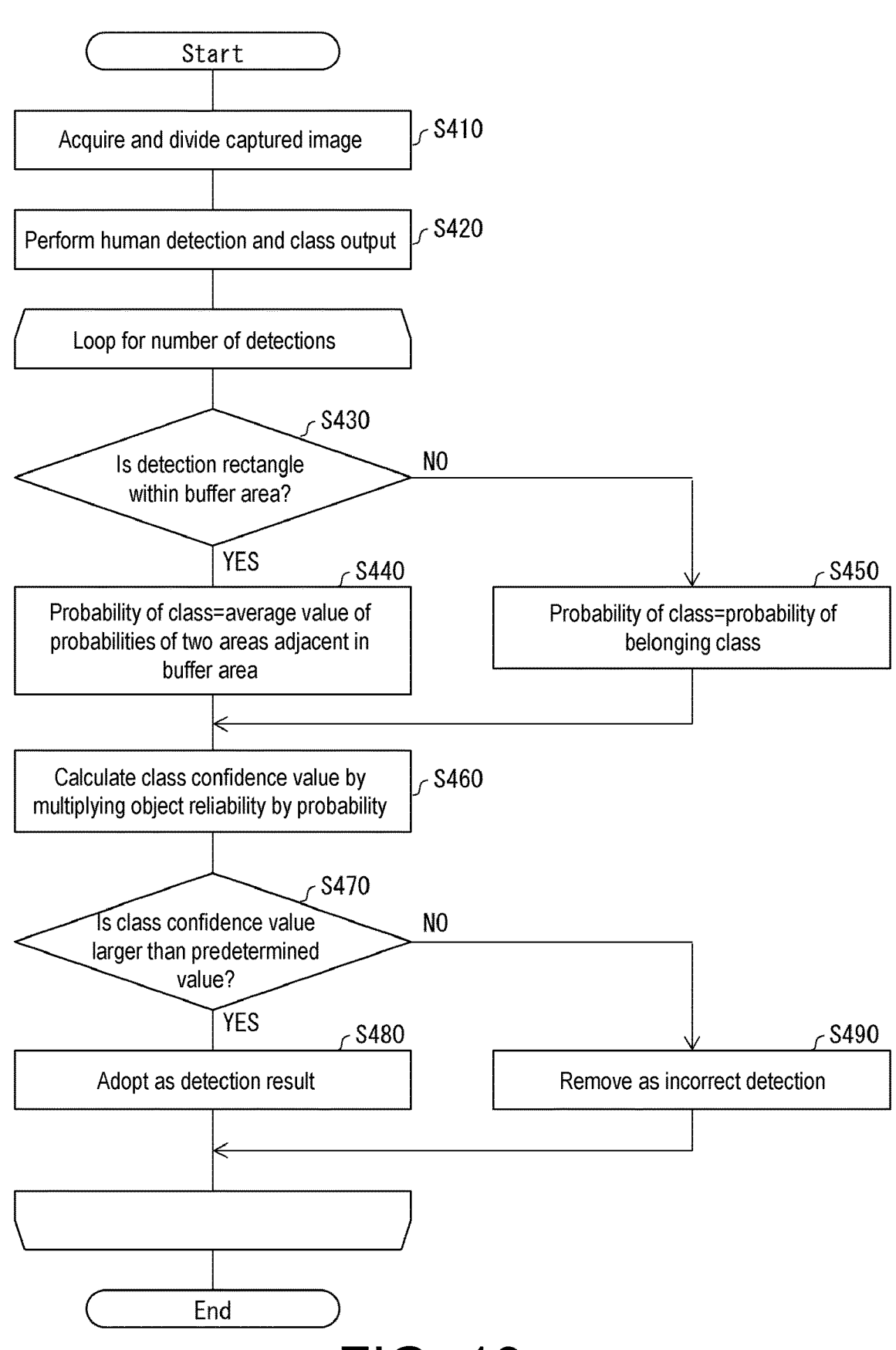
FIG. 19 is a flowchart illustrating an example of a human detection process in which, when a buffer area is set, the second determination process is performed to detect a human.

When the position PS of the detection target OB surrounded by the detection rectangle BB is included in the buffer area BA, the detection device 10 performs the process exemplified in FIG. 19 and determines the correctness of estimation that the "detection target OB is a human."

FIG. 19 is a flowchart illustrating an example of a human detection process in which, when a buffer area BA is set, the second determination process is performed to detect a human. The processes S410, S420, and S470 to S490 in the second determination process exemplified in FIG. 19 are the same as the processes S310, S320, and S350 to S370 in the second determination process exemplified in FIG. 14.

That is, the image acquisition part 110 acquires the captured image PI, and the division part 120 divides the captured image PI acquired by the image acquisition part 110 into a plurality of areas AR (S410). The estimation part 150 refers to the divided image information 130 and performs human detection and class output on the acquired captured image PI (the captured image PI divided into a plurality of areas AR) using the trained model 140 (S420).

The detection device 10 performs processes S430 to S490 corresponding to the number of humans detected from the captured image PI by the estimation part 150, in other words, the number of detection rectangles BB set by the estimation part 150 for each detection rectangle BB (that is, for each detection target OB).

For each detection rectangle BB, the determination part 190 determines whether "the detection rectangle BB is within the buffer area BA (is inside the buffer area BA)" (S430), that is, determines whether "the detection rectangle BB is present inside the buffer area BA." The determination part 190 may determine, for each detection rectangle BB, whether "'the position PS of the detection target OB surrounded by the detection rectangle BB' is within the buffer area BA." The position PS of the detection target OB is calculated from the detection rectangle BB (the position, shape, and size of the detection rectangle BB) and may be, for example, the center position (or the position of the center of gravity) of the detection rectangle BB.

If the detection rectangle BB is within the buffer area BA (YES in S430), the determination part 190 calculates, as the probability PR of the detection rectangle BB (class probability), the average value of the probabilities PR of the following two areas AR adjacent to each other in the buffer area BA. That is, the determination part 190 calculates the average value of the probability PR of the area AR corresponding to the specific area IA and the probability PR of the area AR adjacent to the area AR corresponding to the specific area IA.

For example, if the detection rectangle BB is within the buffer area BA(x–y) between the "area AR(x) which is the specific area IA of the detection rectangle BB" and the "area AR(y) adjacent to the area AR(x)," the determination part 190 set the probability PR of the detection rectangle BB (class probability) to the following value. That is, the determination part 190 sets the probability PR of the detection rectangle BB to the average value of the "probability PR(x) of the area AR(x)" and the "probability PR(y) of the area AR(y)."

If the detection rectangle BB is not within the buffer area BA (NO in S430), the determination part 190 sets the probability PR of the detection rectangle BB (class probability) to the probability PR of the area AR to which the detection rectangle BB belongs, that is, the probability PR of the "area AR which is the specific area IA of the detection rectangle BB."

For example, if the detection rectangle BB belongs only to the "area AR which is the specific area IA of the detection rectangle BB," the determination part 190 sets the probability PR of the detection rectangle BB (class probability) to the probability PR of the "area AR which is the specific area IA of the detection rectangle BB."

The determination part 190 may determine "whether the detection rectangle BB is within the buffer area BA" according to whether the buffer area BA includes the "position PS of the detection target OB surrounded by the detection rectangle BB (the position PS calculated from the detection rectangle BB)." For example, the determination part 190 may determine "whether the detection rectangle BB is within the buffer area BA" according to whether the buffer area BA includes the center position (or the position of the center of gravity) of the detection rectangle BB.

For each detection rectangle BB, the determination part 190 multiplies the object reliability OR of the detection rectangle BB by the "class probability of the detection rectangle BB" to calculate the class confidence value CR of the detection rectangle BB (S460). Then, the determination part 190 determines whether the "class confidence value CR of the detection rectangle BB is larger than a predetermined value TH" (S470).

If "the class confidence value CR of the detection rectangle BB is larger than a predetermined value TH" (YES in S470), the determination part 190 adopts the detection rectangle BB as the correct detection result (S480). That is, the determination part 190 determines that "the class confidence value CR of the detection rectangle BB is larger than a predetermined value TH" and that "estimation that 'the detection target OB surrounded by the detection rectangle BB is a human' is correct."

If "the class confidence value CR of the detection rectangle BB is equal to or less than a predetermined value TH" (NO in S470), the determination part 190 removes the detection rectangle BB as an incorrect detection (S490). That is, the determination part 190 determines that "the class confidence value CR of the detection rectangle BB is equal to or less than a predetermined value TH" and that "estimation that 'the detection target OB surrounded by the detection rectangle BB is a human' is incorrect."

As described with reference to FIG. 17 to FIG. 19, if the class confidence value CR calculated by multiplying the average value of the probabilities PR of the following two areas AR by the object reliability OR of the detection rectangle BB is larger than a predetermined value TH, the determination part 190 may determine that the "detection target OB is a human." That is, the determination part 190 may calculate the class confidence value CR from the average value of the probability PR of the "area AR corresponding to the specific area IA among the plurality of areas AR" and the probability PR of the "area AR adjacent to the area AR corresponding to the specific area IA among the plurality of areas AR."

According to the above configuration, the detection device 10 calculates the average value of the probability PR of the "area AR corresponding to the specific area IA among the plurality of areas AR" and the probability PR of the "area AR adjacent to the area AR corresponding to the specific area IA among the plurality of areas AR." Then, if "the class confidence value CR calculated by multiplying the calculated average value by the object reliability OR of the detection rectangle BB" is larger than a predetermined value TH, the detection device 10 determines that the "detection target OB is a human."

Here, in the captured image PI, a condition in which a human is imaged across two areas AR among the plurality of areas AR or the position where a human is imaged is near the boundary between two areas AR is assumed.

Under such a condition, when the detection target OB estimated to be a human is actually a human, the probability PR of the "area AR corresponding to the specific area IA" and the probability PR of the "area AR adjacent to the area AR corresponding to the specific area IA" are both considered to be a sufficiently high value. Similarly, when the detection target OB estimated to be a human is actually a human, the object reliability OR of the detection rectangle BB, which is a value indicating the degree of possibility that a certain object is surrounded by the "detection rectangle BB surrounding the detection target OB," is also considered to be a sufficiently high value.

Here, the detection device 10 calculates an average value of the probability PR of the "area AR corresponding to the specific area IA" and the probability PR of the "area AR adjacent to the area AR corresponding to the specific area IA." Then, if the class confidence value CR of the detection rectangle BB calculated by multiplying the average value by the object reliability OR of the detection rectangle BB is larger than a predetermined value TH, the detection device 10 determines that the "detection target OB is a human."

Therefore, the detection device 10 has an effect of being able to detect a human from the captured image PI with high accuracy even if a human is imaged near the boundary between two areas AR among the plurality of areas AR in the captured image PI.

When the specification part 170 specifies the foot position as the specific area IA, the determination part 190 may calculate the average value of the probability PR of the "area AR including the foot position" and the probability PR of the "area AR adjacent to the area AR including the foot position." Then, if the class confidence value CR of the detection rectangle BB calculated by multiplying the calculated average value by the object reliability OR of the detection rectangle BB is larger than a predetermined value TH, the determination part 190 may determine that the "detection target OB is a human."

(Summary of Control Method Performed by Detection Device 10)

A control method performed by the detection device 10 that has been described so far with reference to FIG. 7 to FIG. 19 can be summarized as follows. That is, the control method performed by the detection device 10 is a control method for a detection device that detects an imaged human from the captured image PI captured by a ceiling camera using a fish-eye lens. The control method includes a division step, an area estimation step (estimation step), and a determination step.

In the division step, the captured image PI is divided into a plurality of areas AR. In the area estimation step (estimation step), for each of the plurality of areas AR, the probability PR of including "the position PS where the detection target OB estimated to be a human is present" is calculated. In the determination step, it is determined "whether the detection target OB is a human" using the probability PR of each of the plurality of areas AR.

For example, the division step corresponds to S210 in FIG. 7, S310 in FIG. 14, and S410 in FIG. 19. The area estimation step (estimation step) corresponds to S220 in FIG. 7, S320 in FIG. 14, and S420 in FIG. 19. The determination step corresponds to S250 in FIG. 7, S350 in FIG. 14, and S470 in FIG. 19.

According to the above configuration, in the control method, the captured image PI is divided into a plurality of areas AR, and for each of the plurality of areas AR, the probability PR of including "the position PS where the detection target OB estimated to be a human is present" is calculated. Then, in the control method, the estimation result that the "detection target OB is a human" is verified using the probability PR of each of the plurality of areas AR.

Here, generally, when it is attempted to detect a human from an image using a dictionary indicating human characteristics, analysis of the image is required for each dictionary. Therefore, when it is tried to improve human detection accuracy using a plurality of dictionaries indicating human characteristics, it is necessary to analyze the image a plurality of times and a time required to detect a human increases.

On the other hand, in the control method, for each of the plurality of areas AR divided into the captured image PI, "the probability PR of including 'the position PS where the detection target OB estimated to be a human is present'" is calculated. Then, in the control method, using the calculated probability PR of each of the plurality of areas AR, it is determined "whether the detection target OB is a human,"

and thereby human detection accuracy is improved. That is, in the control method, instead of detecting a human from the captured image PI using a plurality of dictionaries indicating human characteristics, whether the detection target OB estimated to be a human is actually a human is determined using the probability PR of each of the plurality of areas AR, and thus human detection accuracy is improved.

In the method using a plurality of dictionaries indicating human characteristics, the accuracy of the estimation itself is improved, but in the control method, the estimated result (estimation that the detection target OB is a human) is verified (that is, the incorrect estimation result is removed), and thus detection accuracy is improved.

Therefore, in the control method, it is not necessary to use a plurality of dictionaries indicating human characteristics in order to detect a human from the captured image PI and it is possible to shorten the time required to detect a human from the captured image PI compared to when a human is detected from the captured image PI using a plurality of dictionaries.

In addition, in the control method, whether the detection target OB estimated to be a human is a human is determined (verified) using the probability PR of each of the plurality of areas AR, and thus it is possible to detect a human from the captured image PI with high accuracy.

Therefore, the control method has an effect of being able to detect a human from an image captured using a fish-eye lens (captured image PI) at a high speed and with high accuracy.

In addition, as described above, in the control method, it is not necessary to use a plurality of dictionaries indicating human characteristics in order to detect a human from the captured image PI.

Therefore, the control method has an effect of reducing the time and effort required to prepare a dictionary (for example, a trained model) required for detecting a human from an image captured using a fish-eye lens and reducing the memory capacity required to store the dictionary.

§ 4. Modified Example

It is not essential for the detection device 10 to perform the learning process, that is, an object that generates the trained model 140 is not essentially the detection device 10. For the detection device 10 that detects "a human captured in the captured image PI" from the captured image PI, it is sufficient to detect "a human captured in the captured image PI" from the captured image PI using the trained model 140, and it is not essential to generate the trained model 140. In other words, it is not essential for the detection device 10 to include the training data generation part 210 and the learning part 220.

A trained model generation device different from the detection device 10, which includes the training data generation part 210 and the learning part 220, may generate the trained model 140. Then, the detection device 10 may detect "a human captured in the captured image PI" from the captured image PI using the trained model 140 generated by the trained model generation device.

The specification part 170 may calculate the position PS of the detection target OB from the detection rectangle BB, for example, calculate from the position, shape, and size of the detection rectangle BB.

[Example of Implementation by Software]

The functional blocks of the detection device 10 (specifically, the image acquisition part 110, the division part 120, the estimation part 150, the specification part 170, the determination part 190, the training data generation part 210, and the learning part 220) may be implemented by a logic circuit (hardware) formed in an integrated circuit (IC chip) or the like. In addition, these functional blocks may be implemented by software using a CPU, a GPU, a DSP and the like.

In the latter case, the detection device 10 includes a CPU, a GPU, a DSP and the like that execute instructions of a program, which is software for implementing functions, a read only memory (ROM) or a storage device (these are referred to as "recording media") in which the program and various types of data that can be read by a computer (or a CPU, a GPU, a DSP and the like) are recorded, and a random access memory (RAM) that opens the program and the like. Thus, when the computer (or a CPU, a GPU, a DSP and the like) reads and executes the program from the recording medium, the objective of the present invention is achieved. As the recording medium, "non-transitory tangible media," for example, a tape, a disk, a card, a semiconductor memory, a programmable logic circuit and the like can be used. In addition, the program may be supplied to the computer through an arbitrary transmission medium (such as a communication network and broadcast waves) that can transmit the program. Here, in the present invention, the program may be implemented in the form of a data signal combined with carrier waves embodied according to electronic transmission.

Summary

As described above, the detection device according to one aspect of the present invention is a detection device that detects an imaged human from an captured image captured by a ceiling camera using a fish-eye lens, and includes a division part that divides the captured image into a plurality of areas, an area estimation part that calculates a probability that each of the plurality of areas includes a position where a detection target estimated to be a human is present, and a determination part that determines whether the detection target is a human using the probability of each of the plurality of areas.

According to the above configuration, the detection device divides the captured image into a plurality of areas, and calculates the probability that each of the plurality of areas includes "the position where the detection target estimated to be a human is present." Then, the detection device verifies the estimation result that the detection target is a human using the probability of each of the plurality of areas.

Here, generally, when it is attempted to detect a human from an image using a dictionary indicating human characteristics, analysis of the image is required for each dictionary. Therefore, when it is tried to improve human detection accuracy using a plurality of dictionaries indicating human characteristics, it is necessary to analyze the image a plurality of times and a time required to detect a human increases.

On the other hand, the detection device determines whether the detection target is a human using "the probability of including the 'position where the detection target estimated to be a human is present'," calculated for each of the plurality of areas obtained by dividing the captured image and thus improves human detection accuracy. That is, the detection device does not detect a human from the captured image using a plurality of dictionaries indicating human characteristics, but determines whether the detection target estimated to be a human is a human using the probability of each of the plurality of areas, and thus improves human detection accuracy.

In the method using a plurality of dictionaries indicating human characteristics, the accuracy of the estimation itself is improved, but the detection device verifies (that is, removes incorrect estimation results from) the estimated result (estimation that the detection target is a human), and thus improves detection accuracy.

Therefore, the detection device does not need to use a plurality of dictionaries indicating human characteristics in order to detect a human from the captured image and can shorten the time required to detect a human from the captured image compared to when a human is detected from the captured image using a plurality of dictionaries.

In addition, the detection device determines (verifies) whether the detection target estimated to be a human is a human using the probability of each of the plurality of areas, and thus can detect a human from the captured image with high accuracy.

Therefore, the detection device has an effect of being able to detect a human from an image captured using a fish-eye lens (captured image) at a high speed and with high accuracy.

In addition, as described above, the detection device does not need to use a plurality of dictionaries indicating human characteristics in order to detect a human from the captured image.

Therefore, the detection device has an effect of reducing the time and effort required to prepare a dictionary (for example, a trained model) required for detecting a human from an image captured using a fish-eye lens and reducing the memory capacity required to store the dictionary.

The detection device according to one aspect of the present invention may further include a specification part that specifies an area where a bounding box surrounding the detection target is present among the plurality of areas as a specific area, and the determination part may determine whether the detection target is a human using the probability of each of the plurality of areas and the specific area.

According to the above configuration, the detection device specifies the specific area in which the bounding box is present among the plurality of areas and determines whether the detection target is a human using the probability of each of the plurality of areas and the specific area.

For example, when the detection target estimated to be a human is actually a human, consistency between the probability of each of the plurality of areas and the area (the specific area) in which the bounding box surrounding the detection target is present is also considered to be high.

Here, the detection device determines whether the detection target is a human using the probability of each of the plurality of areas and the specific area, that is, verifies estimation that the detection target is a human.

Therefore, the detection device has an effect of being able to detect a human from an image captured using a fish-eye lens (captured image) with high accuracy.

The specification part may specify the position of the detection target, which is surrounded by the bounding box and estimated to be a "human" (for example, the position corresponding to the feet of the detection target estimated to be a "human") or the area including the position of the detection target as the specific area. The specification part may calculate the position (foot position) of the detection target from the bounding box, for example, calculate from the position, shape, and size of the bounding box. In addition, the specification part may specify the center position (or the position of the center of gravity) of the bounding box as "the position (foot position) of the detection target, which is surrounded by the bounding box and estimated to be a 'human'."

In the detection device according to one aspect of the present invention, the determination part may determine that the detection target is a human in a case where the specific area matches an area with the highest probability among the plurality of areas.

According to the above configuration, the detection device determines that the detection target is a human if the specific area matches the area with the highest probability among the plurality of areas. That is, the detection device determines that the detection target is a human if the "the area (the specific area) in which the bounding box surrounding the detection target estimated to be a human is present" matches "the area with the highest probability of including the position where the detection target estimated to be a human is present."

When the detection target estimated to be a human is actually a human, the possibility that the specific area in which the bounding box surrounding the detection target is present matches the "area with the highest probability of including the position where the detection target is present" is considered to be high.

Here, the detection device determines that the detection target is a human if the specific area matches the area with the highest probability among the plurality of areas.

Therefore, the detection device has an effect of being able to detect a human from an image captured using a fish-eye lens (captured image) with high accuracy.

When the specification part specifies the position (foot position) of the detection target, which is surrounded by the bounding box and estimated to be a "human," as the specific area, the determination part may determine whether the foot position is included in the area with the highest probability. The determination part may determine that the detection target is a human if the foot position is included in the area with the highest probability.

In the detection device according to one aspect of the present invention, in a case where the specific area matches the area with the highest probability among the plurality of areas or the area adjacent to the area with the highest probability among the plurality of areas, the determination part may determine that the detection target is a human.

According to the above configuration, if the specific area matches the area with the highest probability among the plurality of areas or the area adjacent to the area with the highest probability among the plurality of areas, the detection device determines that the detection target is a human.

Here, in the captured image, a condition in which a human is imaged across two areas among the plurality of areas or the position where a human is imaged is near the boundary between two areas is assumed.

Under such a condition, when the detection target estimated to be a human is actually a human, it is considered that the specific area where the bounding box surrounding the detection target is present is highly likely to match any of the following areas. That is, it is considered that the specific area is highly likely to match the area with the highest probability among the plurality of areas or the area adjacent to the area with the highest probability among the plurality of areas.

Here, if the specific area matches the area with the highest probability among the plurality of areas, the detection device determines that the detection target is a human. In addition, if the specific area matches the area adjacent to the area with the highest probability among the plurality of areas, the detection device determines that the detection target is a human.

Therefore, the detection device has an effect of being able to detect a human from the captured image with high accuracy even if a human is imaged near the boundary between two areas among the plurality of areas in the captured image.

When the specification part specifies the foot position as the specific area, the determination part may determine whether the foot position is included in the area with the highest probability or the area adjacent to the area with the highest probability. The determination part may determine that the detection target is a human if the foot position is included in the area with the highest probability or the area adjacent to the area with the highest probability.

In the detection device according to one aspect of the present invention, in a case where a class confidence value calculated by multiplying the probability of "an area corresponding to the specific area among the plurality of areas" by an object reliability is larger than a predetermined value, the determination part may determine that the detection target is a human. The object reliability is a value indicating a degree of possibility that a certain object is surrounded by the bounding box.

According to the above configuration, the detection device determines that the detection target is a human if the class confidence value calculated by multiplying the probability of the area corresponding to the specific area among the plurality of areas by the object reliability is larger than a predetermined value.

When the detection target estimated to be a human is actually a human, the probability that the specific area in which the bounding box surrounding the detection target is present includes the position where the detection target is present is considered to be sufficiently high. In addition, when the detection target estimated to be a human is actually a human, the object reliability, which is a value indicating the degree of possibility that a certain object is surrounded by the bounding box surrounding the detection target, is also considered to be a sufficiently high value.

Here, the detection device determines that the detection target is a human if the class confidence value calculated by multiplying the probability of the "area corresponding to the specific area among the plurality of areas" by the object reliability is larger than a predetermined value.

Therefore, the detection device has an effect of being able to detect a human from an image captured using a fish-eye lens (captured image) with high accuracy.

When the specification part specifies the foot position as the specific area, the determination part may determine that the detection target is a human if the class confidence value calculated by multiplying the probability of the area including the foot position by the object reliability is larger than a predetermined value.

In the detection device according to one aspect of the present invention, the determination part may determine that the detection target is a human in a case where a class confidence value calculated by multiplying an average value of the probability of an "area corresponding to the specific area among the plurality of areas" and the probability of an "area adjacent to the area corresponding to the specific area among the plurality of areas" by an object reliability is larger than a predetermined value. The object reliability is a value indicating a degree of possibility that a certain object is surrounded by the bounding box.

According to the above configuration, the detection device calculates an average value of the probability of the "area corresponding to the specific area among the plurality of areas" and the probability of the "area adjacent to the area corresponding to the specific area among the plurality of areas." Here, the detection device determines that the detection target is a human if the class confidence value calculated by multiplying the average value by the object reliability, which is a value indicating the degree of possibility that a certain object is surrounded by the bounding box, is larger than a predetermined value.

Here, in the captured image, a condition in which a human is imaged across two areas among the plurality of areas or the position where a human is imaged is near the boundary between two areas is assumed.

Under such a condition, when the detection target estimated to be a human is actually a human, the probability of the "area corresponding to the specific area" and the probability of "the area adjacent to the area corresponding to the specific area" are both considered to be a sufficiently high value. Similarly, when the detection target estimated to be a human is actually a human, the object reliability, which is a value indicating the degree of possibility that a certain object is surrounded by the bounding box surrounding the detection target, is also considered to be a sufficiently high value.

Here, the detection device calculates an average value of the probability of "the area corresponding to the specific area" and the probability of "the area adjacent to the area corresponding to the specific area." Here, the detection device determines that the detection target is a human if the class confidence value calculated by multiplying the average value by the object reliability is larger than a predetermined value.

Therefore, the detection device has an effect of being able to detect a human from the captured image with high accuracy even if a human is imaged near the boundary between two areas among the plurality of areas in the captured image.

When the specification part specifies the foot position as the specific area, the determination part may calculate an average value of the probability of "the area including the foot position" and the probability of "the area adjacent to the area including the foot position." Here, the determination part may determine that the detection target is a human if the class confidence value calculated by multiplying the calculated average value by the object reliability is larger than a predetermined value.

In the detection device according to one aspect of the present invention, the area estimation part may calculate the probability of each of the plurality of areas from the captured image using an area prediction model which is a trained model that receives the captured image and outputs the probability that each of the plurality of areas includes the position where the detection target is present.

According to the above configuration, the detection device calculates the probability of each of the plurality of areas from the captured image using an area prediction model which is a trained model that receives the captured image and outputs the probability that each of the plurality of areas includes the position where the detection target is present.

Therefore, the detection device has an effect of being able to calculate the probability of each of the plurality of areas from the captured image with high accuracy using the area prediction model.

The detection device according to one aspect of the present invention may further include a learning part that performs machine learning on training data in which "information indicating an area including 'a position where a human captured in the captured image is present'" is attached as a label to the captured image, to construct an area prediction model which is a trained model that receives the captured image and outputs "the probability that each of the plurality of areas includes 'the position where the detection target is present'."

According to the above configuration, the detection device performs machine learning on training data in which "information indicating an area including 'the position where a human is present'" is attached as a label to the captured image and constructs the area prediction model.

Therefore, the detection device has an effect of being able to construct the area prediction model that enables the probability of each of the plurality of areas to be calculated from the captured image with high accuracy according to machine learning performed on the training data.

In order to achieve the above objective, a control method according to one aspect of the present invention is a control method for a detection device that detects an imaged human from a captured image captured by a ceiling camera using a fish-eye lens, including a division step in which the captured image is divided into a plurality of areas; an area estimation step in which a probability that each of the plurality of areas includes a position where a detection target estimated to be a human is present is calculated; and a determination step of determining whether the detection target is a human using the probability of each of the plurality of areas.

According to the above configuration, in the control method, the captured image is divided into a plurality of areas, and the probability that each of the plurality of areas includes "the position where the detection target estimated to be a human is present" is calculated. Then, in the control method, the estimation result that the detection target is a human is verified using the probability of each of the plurality of areas.

Here, generally, when it is attempted to detect a human from an image using a dictionary indicating human characteristics, analysis of the image is required for each dictionary. Therefore, when it is tried to improve human detection accuracy using a plurality of dictionaries indicating human characteristics, it is necessary to analyze the image a plurality of times and a time required to detect a human increases.

On the other hand, in the control method, using "the probability of including the 'position where the detection target estimated to be a human is present'," calculated for each of the plurality of areas obtained by dividing the captured image, it is determined whether the detection target is a human, and thus human detection accuracy is improved. That is, in the control method, instead of detecting a human from the captured image using a plurality of dictionaries indicating human characteristics, it is determined whether the detection target estimated to be a human is a human using the probability of each of the plurality of areas, and thus human detection accuracy is improved.

In the method using a plurality of dictionaries indicating human characteristics, the accuracy of the estimation itself is improved, but in the control method, the estimated result (estimation that the detection target is a human) is verified (that is, the incorrect estimation result is removed), and thus detection accuracy is improved.

Therefore, in the control method, it is not necessary to use a plurality of dictionaries indicating human characteristics in order to detect a human from the captured image, and it is possible to shorten the time required to detect a human from the captured image compared to when a human is detected from the captured image using a plurality of dictionaries.

In addition, in the control method, it is determined (verified) whether the detection target estimated to be a human is a human using the probability of each of the plurality of areas, and thus it is possible to detect a human from the captured image with high accuracy.

Therefore, the control method has an effect of being able to detect a human from an image captured using a fish-eye lens (captured image) at a high speed and with high accuracy.

In addition, as described above, the control method does not need to use a plurality of dictionaries indicating human characteristics in order to detect a human from the captured image.

Therefore, the control method has an effect of reducing the time and effort required to prepare a dictionary (for example, a trained model) required for detecting a human from an image captured using a fish-eye lens and reducing the memory capacity required to store the dictionary.

In order to achieve the above objective, a model generation method according to one aspect of the present invention is a model generation method performed by a model generation device that generates a trained model, including an acquisition step of acquiring training data in which (A) information indicating a position, shape, and size of a bounding box surrounding a human captured in a captured image and (B) information identifying an "area including 'a position where the human captured in the captured image is present'" are attached as labels to the captured image divided into a plurality of areas; and a learning step in which a trained model is constructed according to machine learning performed on the training data, where the trained model receives the captured image and outputs (C) information indicating the position, shape, and size of the bounding box and (D) "a probability that each of the plurality of areas includes 'a position where the human captured in the captured image is present'".

According to the above configuration, in the model generation method, the trained model is constructed according to machine learning performed on the training data. The trained model outputs the following two pieces of information if the captured image is input. That is, (C) information indicating the position, shape, and size of the bounding box (rectangle information) and (D) "the probability that each of the plurality of areas includes a 'position where a human captured in the captured image is present'" are output.

The rectangle information is information indicating the position, shape, and size of the bounding box surrounding the detection target estimated to be a "human" and is information including estimation that the detection target surrounded by the bounding box is a "human."

Therefore, the model generation method has an effect of being able to construct the trained model that outputs "the rectangle information including estimation that the detection target is a 'human'" and the probability of each of the plurality of areas if the captured image is input.

The present invention is not limited to the above embodiments, and various modifications can be made within the scope of claims, and embodiments obtained by appropriately combining technical methods disclosed in different embodiments are included in the technical scope of the present invention.

The invention claimed is:

1. A detection device that detects an imaged human from a captured image captured by a ceiling camera using a fish-eye lens, the detection device comprising a processor configured to:

divide the captured image into a plurality of areas;

calculate a probability that each of the plurality of areas includes a position where a detection target estimated to be a human is present;

determine whether the detection target is a human using the probability of each of the plurality of areas, and specify an area where a bounding box surrounding the detection target is present among the plurality of areas as a specific area, wherein the processor determines that the detection target is a human in a case where a class confidence value calculated by multiplying an average value of the probability of an area corresponding to the specific area among the plurality of areas and the probability of an area adjacent to the area corresponding to the specific area among the plurality of areas by an object reliability is larger than a predetermined value, the object reliability being a value indicating a degree of possibility that a certain object is surrounded by the bounding box.

2. The detection device according to claim 1, wherein the processor determines that the detection target is a human in a case where the specific area matches an area with the highest probability among the plurality of areas.

3. The detection device according to claim 2, wherein, in a case where the specific area matches an area with the highest probability among the plurality of areas or an area adjacent to the area with the highest probability among the plurality of areas, the processor determines that the detection target is a human.

4. The detection device according to claim 2, wherein the processor is further configured to perform machine learning on training data in which information indicating an area including a position where a human captured in the captured image is present is attached as a label to the captured image, to construct an area prediction model which is a trained model that receives the captured image and outputs the probability that each of the plurality of areas includes the position where the detection target is present.

5. The detection device according to claim 1, wherein, in a case where the specific area matches an area with the highest probability among the plurality of areas or an area adjacent to the area with the highest probability among the plurality of areas, the processor determines that the detection target is a human.

6. The detection device according to claim 1, wherein the processor determines that the detection target is a human in a case where a class confidence value calculated by multiplying the probability of an area corresponding to the specific area among the plurality of areas by an object reliability is larger than a predetermined value, the object reliability being a value indicating a degree of possibility that a certain object is surrounded by the bounding box.

7. The detection device according to claim 1, wherein the area processor calculates the probability of each of the plurality of areas from the captured image using an area prediction model which is a trained model that receives the captured image and outputs the probability that each of the plurality of areas includes the position where the detection target is present.

8. The detection device according to claim 1, wherein the processor is further configured to perform machine learning on training data in which information indicating an area including a position where a human captured in the captured image is present is attached as a label to the captured image, to construct an area prediction model which is a trained model that receives the captured image and outputs the probability that each of the plurality of areas includes the position where the detection target is present.

9. A recording medium which records an information processing program causing a computer to function as the detection device according to claim 1 and is computer-readable, the information processing program causing a computer to function as the processor.

10. A control method for a detection device that detects an imaged human from a captured image captured by a ceiling camera using a fish-eye lens, the control method comprising:

a division step in which the captured image is divided into a plurality of areas;

an area estimation step in which a probability that each of the plurality of areas includes a position where a detection target estimated to be a human is present is calculated;

a specification step of specifying an area where a bounding box surrounding the detection target is present among the plurality of areas as a specific area; and a determination step of determining whether the detection target is a human using the probability of each of the plurality of areas, wherein in the determination step, it is determined that the detection target is a human in a case where a class confidence value calculated by multiplying an average value of the probability of an area corresponding to the specific area among the plurality of areas and the probability of an area adjacent to the area corresponding to the specific area among the plurality of areas by an object reliability is larger than a predetermined value, the object reliability being a value indicating a degree of possibility that a certain object is surrounded by the bounding box.

* * * * *